(12) United States Patent
Mueller

(10) Patent No.: US 12,528,479 B2
(45) Date of Patent: Jan. 20, 2026

(54) PERFORMANCE TESTING FOR ROBOTIC SYSTEMS

(71) Applicant: Five AI Limited, Cambridge (GB)

(72) Inventor: Romain Mueller, Cambridge (GB)

(73) Assignee: Five AI Limited, Cambridge (GB)

( * ) Notice: Subject to any disclaimer, the term of this patent is extended or adjusted under 35 U.S.C. 154(b) by 196 days.

(21) Appl. No.: 18/273,075

(22) PCT Filed: Jan. 28, 2022

(86) PCT No.: PCT/EP2022/051990
§ 371 (c)(1),
(2) Date: Jul. 19, 2023

(87) PCT Pub. No.: WO2022/162116
PCT Pub. Date: Aug. 4, 2022

(65) Prior Publication Data
US 2024/0001942 A1    Jan. 4, 2024

(30) Foreign Application Priority Data

Jan. 29, 2021   (GB) ...................................... 2101254

(51) Int. Cl.
*B60W 50/02*   (2012.01)
*B60W 60/00*   (2020.01)
(Continued)

(52) U.S. Cl.
CPC ...... *B60W 50/0205* (2013.01); *B60W 60/001* (2020.02); *G06N 20/00* (2019.01);
(Continued)

(58) Field of Classification Search
CPC ............ B60W 50/0205; B60W 60/001; G06N 20/00; G06N 3/045; G06N 3/08;
(Continued)

(56) References Cited

U.S. PATENT DOCUMENTS

| | | | |
|---|---|---|---|
| 10,719,783 B2 * | 7/2020 | McCourt, Jr. | ........... G06F 17/18 |
| 2016/0174902 A1 * | 6/2016 | Georgescu | ........... G06V 10/454 |
| | | | 600/408 |

(Continued)

OTHER PUBLICATIONS

Kelvin Wong et al., "Testing the Safety of Self-driving Vehicles by Simulating Perception and Prediction", Arxiv. Org, Cornell University Library, 201 Olin Library Cornell University Ithaca, NY 14853, Aug. 13, 2020 (Aug. 13, 2020), pp. 1-11.*

(Continued)

*Primary Examiner* — Andrew R Dyer
(74) *Attorney, Agent, or Firm* — Andrew J. Tibbetts; Greenberg Traurig, LLP

(57) ABSTRACT

A computer-implemented method of modelling a perception system for perceiving objects captured in sensor data comprises: receiving a plurality of training examples, each comprising a ground truth scene for a set of sensor data and a corresponding perceived scene obtained by applying the perception system to the set of sensor data; fitting to the training examples noise model parameters, encoding a noise distribution over perceived scenes given a misdetection scene, and misdetection model parameters, encoding a misdetection distribution over misdetection scenes given a ground truth scene; computing a perception distribution over perceived scenes for a given ground truth scene by marginalizing the product of noise and misdetection distributions over multiple misdetection scenes, wherein individual objects in the ground truth scene are not associated with individual objects in the perceived scenes; fitting the noise and misdetection model parameters to match the perception distribution to the perceived scene for each training example.

20 Claims, 20 Drawing Sheets

(51) Int. Cl.
    *G06N 20/00*     (2019.01)
    *G06V 10/776*    (2022.01)
    *G06V 10/82*     (2022.01)
    *G06V 20/56*     (2022.01)

(52) U.S. Cl.
    CPC ............ *G06V 10/776* (2022.01); *G06V 10/82* (2022.01); *G06V 20/56* (2022.01)

(58) Field of Classification Search
    CPC ...... G06V 10/776; G06V 10/82; G06V 20/56; G06F 30/20; G06F 11/3684; G06F 11/3698; G06T 11/00
    USPC .......................................................... 701/25
    See application file for complete search history.

(56) References Cited

U.S. PATENT DOCUMENTS

| | | | |
|---|---|---|---|
| 2018/0211303 A1* | 7/2018 | Chatwin | G06N 20/00 |
| 2019/0317510 A1 | 10/2019 | Ros Sanchez | |
| 2021/0312246 A1* | 10/2021 | Feldman | G06V 20/58 |
| 2021/0357680 A1* | 11/2021 | Chen | G06N 3/047 |
| 2022/0180229 A1* | 6/2022 | Plumley | G06N 5/041 |

OTHER PUBLICATIONS

International Search Report; PCT/EP2022/051990; Date: Jul. 1, 2022; By: Authorized Officer: Targon, Valerio.

* cited by examiner

PERFORMANCE TESTING FOR ROBOTIC SYSTEMS

CROSS-REFERENCE TO RELATED APPLICATIONS

This application is the U.S. National Stage application, pursuant to 35 U.S.C. § 371, of PCT International Patent Application No. PCT/EP2022/051990, filed Jan. 28, 2022, designating the United States and published in English, which claims priority under 35 U.S.C. §§ 119 and 365 to Great Britain Patent Application No. 2101254.7, filed Jan. 29, 2021. The contents of each of the aforementioned applications are incorporated herein by reference in their entirety.

TECHNICAL FIELD

This disclosure pertains to performance testing of autonomous vehicles and other robotic systems. Performance testing is critical to ensure such systems can perform to a guaranteed level of safety.

BACKGROUND

It has been estimated that, in order for an autonomous vehicle (AV) to achieve a level of safety that matches that of human drivers, a maximum of 1 error per $10^7$ autonomous driving decisions must be guaranteed across the entire Operational Design Domain (ODD) of the AV.

This presents an enormous challenge given the complexity both of an AV and the ODD itself. A self-driving system is an exceptionally complex assembly of cross-dependent and interacting software and hardware components, each prone to limitations or error. Several of the components use neural networks for object detection, type classification, action prediction and other critical tasks. That system needs to operate safely in the ODD. In this context, the ODD characterises all possible driving scenarios the AV might ever encounter and therefore itself holds infinite possibilities, with variables including road topologies, users, appearances, lighting, weather, behaviours, seasons, velocities, randomness and deliberate actions.

An industry standard approach to safety testing is based on actual driven test miles. A fleet of autonomous vehicles is driven by test drivers and a decision is characterised as unsafe when it is necessary for a test driver to intervene. Once an instance of test driver intervention has occurred in a particular real-world driving scenario, the circumstances of that driving scenario can be explored to isolate whatever factors caused the AV to behave unsafely and take appropriate mitigating action.

SUMMARY

Simulation has been used for safety testing but is only useful if the simulated scenarios are sufficiently realistic (if an AV planner makes an unsafe decision in a simulated scenario that is completely unrealistic, that is much less useful in the context of safety testing than an instance of unsafe behaviour in a realistic scenario).

One approach runs simulations based on real-world scenarios in which test driver intervention was necessary. The sensor outputs from the AV are collected and can be used to reconstruct, in a simulator, a driving scenario which necessitated test driver intervention. Variables of the scenario may be "fuzzed" at a planning level in order to test variations of the real-world scenario that are still realistic. In this manner, more information about the cause of the unsafe behaviour can be obtained, analysed and used to improve prediction and planning models. However, a significant problem arises because, as the number of errors per decision reduces, the number of test miles that need to be driven in order to find a sufficient number of instances of unsafe behaviour increases. A typical AV planner might take, on average, about 1 decision every two seconds. At an average speed of 20 miles per hour, that equates to around 90 decisions per mile driven. This, in turn, implies less than one error per $10^5$ driven miles in order to match a human level of safety. Robust safety testing would require many multiples of that to sufficiently test the AV across its ODD. This is exacerbated further as the perception stack evolves as, with every change to the perception stack, more test miles are needed. For those reasons, this approach is simply not viable when testing at a level of safety approaching that of humans.

There are other problems with existing approaches to simulation.

One approach is planning-level simulation, but this fails to adequately account for the effect of perception errors. Numerous factors can influence perception errors such as weather, lighting, distance to or velocity of another vehicle, occlusion etc.

An alternative would be full "photorealistic" simulation, in which the entire hardware and software stack of an AV is simulated. However, this in itself is an enormous challenge. An AV perception pipeline will typically be made up of multiple perception components which cooperate to interpret the AV's sensor outputs.

One problem is that certain perception components, such as Convolutional Neural Networks (CNNs), are particularly sensitive to the quality of the simulated data. Although it is possible to generate high quality simulated image data, the CNNs in perception are extremely sensitive to even the minutest deviations from real data. Therefore, these would require exceptionally high-quality simulated image data covering all possible conditions that an AV might encounter in the real-world (e.g. different combinations of simulated weather conditions, lighting conditions etc.)—otherwise their behaviour in a simulated scenario will not adequately reflect their behaviour in the real-world.

A second problem is that certain types of sensor data are particularly hard to model (simulate). Thus, even a perception system that is not particularly sensitive to the quality of the input data will give poor results, e.g. RADAR falls into the category of sensor data that is extremely difficult to simulate. This is because the physics of RADAR is inherently hard to model.

A third overarching problem is that of computational efficiency. Based on current hardware constraints, it is estimated that it might, at best, be possible to achieve photorealistic simulation in real-time (even if the other problems could be overcome).

The present disclosure provides a materially different approach to simulation-based safety testing using what are referred to herein as "Perception Statistical Performance Models" (PSPMs). A core problem addressed in this disclosure is that of simulating realistic perception outputs—that is, perception outputs with realistic errors—in a way that is not only more robust than photorealistic simulation but also significantly more efficient.

PSPMs model perception errors in terms of probabilistic uncertainty distributions, based on a robust statistical analysis of actual perception outputs computed by a perception component or components being modelled. A unique aspect of PSPMs is that, given a perception ground truth (i.e. a "perfect" perception output that would be computed by a perfect but unrealistic perception component), a PSPM provides a probabilistic uncertainty distribution that is representative of realistic perception components that might be provided by the perception component(s) it is modelling. For example, given a ground truth 3D bounding box, a PSPM which models a 3D bounding box detector will provide an uncertainty distribution representative of realistic 3D object detection outputs. Even when a perception system is deterministic, it can be usefully modelled as stochastic to account for epistemic uncertainty of the many hidden variables on which it depends on practice.

Perception ground truths will not, of course, be available at runtime in a real-world AV (this is the reason complex perception components are needed that can interpret imperfect sensor outputs robustly). However, perception ground truths can be derived directly from a simulated scenario run in a simulator. For example, given a 3D simulation of a driving scenario with an ego vehicle (the simulated AV being tested) in the presence of external actors, ground truth 3D bounding boxes can be directly computed from the simulated scenario for the external actors based on their size and pose (location and orientation) relative to the ego vehicle. A PSPM can then be used to derive realistic 3D bounding object detection outputs from those ground truths, which in turn can be processed by the remaining AV stack just as they would be at runtime.

A typical scene encountered in autonomous driving will include multiple ground truth objects (whether real or simulated). One way to accommodate multiple objects is to separately apply a PSPM for each object. However, there are limitations for this approach when it comes to modelling correlations between objects. Another issue is the modelling of "false positive" detections, which is challenging within this single object framework.

Disclosed herein is an approach for modelling perception for ground-truth scenes comprising multiple objects on a 'set-to-set' basis—i.e. a perceived scene comprising a set of perceived objects is modelled, given a ground-truth scene comprising a set of ground-truth objects. The set-to-set approach described herein models a probability distribution factorised into a noise model, which determines a probability distribution over object positions for a given 'misdetection' scene; and a misdetection model, which determines a probability distribution over 'misdetection' scenes for the given ground-truth scene.

An advantage of the set-to-set approach is that the ground-truth scene is considered as a 110 whole when modelling misdetection scenes, so no fixed association is required between objects of the ground-truth scene and objects of the perceived scene. This allows statistically informed modelling of perception errors, including object correlations, swapped objects, false negatives, false positives, etc. A particular benefit of the described approach is, among other things, the ability to model misdetections (i.e. false negatives and false positives) in a fully 115 probabilistic way, such that different misdetection outcomes can be obtained via repeated sampling.

A first aspect herein disclosed provides a computer-implemented method of modelling a perception system, the perception system for perceiving objects captured in sensor data, the method comprising:
receiving a plurality of training examples, each comprising a ground truth scene for a set of sensor data and a corresponding perceived scene obtained by applying the perception system to the set of sensor data;
fitting, to the training examples, one or more noise model parameters and one or more misdetection model parameters, the noise model parameters encoding a noise distribution over possible perceived scenes given a misdetection scene, and the misdetection model parameters encoding a misdetection distribution over possible misdetection scenes given a ground truth scene;
wherein a perception model distribution over possible perceived scenes is computed for the ground truth scene of each training example, by marginalizing the product of the noise distribution with the misdetection distribution over multiple possible misdetection scenes, wherein a number of objects in each of the multiple misdetection scenes is constrained to match a number of objects in the perceived scene, but the number of objects in the ground truth scene is not constrained to match a number of objects in the perceived scene, and the training example does not associate individual objects in the ground truth scene with individual objects in the corresponding perceived scene;
wherein the noise and misdetection model parameters are fitted so as to substantially match the perception model distribution to the perceived scene for each training example.

The noise and misdetection parameters may be fitted by applying maximum likelihood estimation to match the perception model distribution to the perceived scene for each training example.

The misdetection model parameters may comprise one or more false positive parameters and one or more false negative parameters, the false positive parameters encoding a false positive distribution over false positive misdetections, and the false negative parameters encoding a false negative distribution over false negative misdetections, wherein the misdetection distribution is a product of the false positive distribution and the false negative distribution.

The marginalization may be performed by summing the product over multiple permutations of false positive and false negative outcomes.

The product may be summed over a determined subset of possible misdetection scenes, the subset determined based on one or more heuristics.

The subset may be a determined subset of possible false positive-false negative permutations.

The noise model parameters may encode a set of single-object noise distributions over possible object positions, each single-object noise distribution corresponding to an object of the misdetection scene, wherein the noise distribution over possible perceived scenes for a given misdetection scene is a product of the single-object noise distributions for that misdetection scene.

Noise model parameters may comprise one or more Gaussian noise model parameters, and the misdetection model parameters may comprise one or more Gaussian noise model parameters.

The noise model parameters may be weights of a first neural network, and the misdetection model parameters may be weights of a second neural network.

The first neural network(s) may predict, in dependence on the noise model parameters, one or more noise distribution parameters of the noise distribution, and the second neural network(s) may predict, in dependence on the misdetection model parameters, one or more misdetection distribution parameters of the misdetection distribution.

The noise model parameters and misdetection model parameters may be fitted to samples of the noise and misdetection distributions.

The first neural network(s) may be used to generate the samples of the noise distribution, and the second neural network(s) may be used to generate the samples of the misdetection distribution.

A second aspect herein disclosed provides a method of simulating realistic perceived scenes of a perception system, the method comprising:

receiving a ground truth scene comprising one or more objects;

processing the ground truth scene in a perception model to determine a perception distribution over possible perceived scenes, the perception model comprising noise parameters and misdetection parameters, the noise parameters and misdetection parameters trained to model the perception system in accordance with any preceding claim;

sampling from the perception distribution one or more times to generate one or more realistic perceived scenes for the given ground truth scene.

The perception distribution may be sampled from multiple times, in order to obtain multiple realistic perceived scenes with different misdetection outcomes for the same ground truth scene.

The different misdetection outputs comprise different combinations of false positive and/or false negative object detections.

The perception ground truth scene is generated directly from a simulated scenario, such that the perception ground truth scene corresponds to an output of the perception system but is generated without applying the perception system and without the use of synthetic sensor data.

The method may be applied to performance test a robotic planner in the presence of realistic perception error, wherein the robotic planner plans a trajectory for a mobile robot in the simulated scenario based on a realistic perceived scene sampled from the perception distribution.

The method may be applied to performance test a planning and prediction system comprising the robotic planner and a prediction stack, wherein the robotic planner plans the trajectory based on one or more agent trajectories predicted by the prediction stack based on the realistic perceived scene.

The method may comprise applying, by a test oracle, a set of predetermined rules to assess the behaviour of the mobile robot in the simulated scenario.

Further aspects herein provide a computer system comprising one or more computers configured to implement the method of any aspect or embodiment herein, and a computer program configured so as, when executed on one or more computers, to implement the same.

BRIEF DESCRIPTION OF FIGURES

For a better understanding of the present disclosure, and to show how embodiments of the same may be put into effect, reference is made to the accompanying figures in which.

DETAILED DESCRIPTION

Described below are methods for generating realistic perception outputs using PSPMs. The description below, up to section 3, is provided as context to explain the general principles of PSPMs, as this context is not currently available in the public domain. This overview refers to modelling perception outputs for a given perception 'ground truth', where the ground-truth and outputs may refer either to individual objects of the scene or to a set of multiple objects. Note that while the description may refer to single-object models for simplicity, the principles may be applied to either single-object or set-to-set models.

Probabilistic set-to-set PSPMs are described from Section 4. Set-to-set PSPMs model a probability distribution over perceived scenes, given a 'ground-truth' scene, each scene comprising multiple objects. Set-to-set PSPMs may be implemented as a probabilistic model, with parameters which may be fit to data.

1. Overview

The following description used the terms "PSPM" and "PRISM" interchangeably.

When making a safety case for an autonomous vehicle, it is impractical to perform all the required testing in the real world. However, constructing a simulation with such high fidelity that the vehicle's perception systems perform equivalently on real and simulated data is an unsolved problem. An approach referred to herein as "PRISM" addresses this problem by constructing a surrogate model of a perception system, including both the sensors and the perception component(s) that interpret the sensor data captured by the sensors. A PRISM is a distribution over plausible perception outputs given some low-fidelity scene representation (perception ground truth).

Expanding on the above, ensuring self-driving technologies are provably safe requires testing of self-driving technologies in a very large number of situations. Performing this testing with real cars is expensive and time consuming. In natural scenarios, most miles that are driven will be uneventful— in Great Britain in 2016, there were 136,621 injuries and 1,792 deaths due to road accidents, and 323.7 billion miles driven by all motor vehicles, which is only one accident every 2.4 million miles driven. Simulation must form part of a testing strategy for self-driving technologies. Simulated miles are much cheaper than real miles, and it is easier and safer to increase the number of hazards per mile in simulation than in the real world.

Figure 11:
FIG. 11 shows an example of simulated image data, to which certain forms of perception component are highly sensitive.

One approach to generating realistic perception outputs is via a high-fidelity simulation of the world, including sensor measurements. In this approach, 'photo-realistic' sensor readings are produced, which are fed to the car's software in place of real sensor readings, e.g. a realistic twin of the real world rendered as an image for input to perception. Such a rendering is shown in FIG. 11. The car software outputs control signals for the car's actuators, which are fed to a physics simulation. New sensor readings are produced based on the output of the physics simulation, closing the loop. This approach requires producing accurate models for tasks that range from challenging to unsolved:

- The road surface, vehicle dynamics and other physical properties are possible to simulate with current technology, but not well understood.
- GPS, IMU and wheel-encodings are possible to simulate, but getting their error statistics correct is important.
- Visual appearance, camera lens and image sensor modelling are reasonably well understood, but high-fidelity rendering is slow.
- Lidar modelling is similar to camera modelling, though with different material reflectance properties. The scanning nature of lidar is an additional complication.
- Radar returns are very hard to model accurately with current technology, due to difficulty in modelling relevant material properties, detailed dependence on shapes and multiple reflections.
- Worst of all, the neural networks that are state-of-the-art for visual object detection are extremely sensitive to detailed image statistics, and constructing synthetic images that cause the same network behaviour as equivalent real images is an unsolved problem.

Inaccurate models of the above sensors will affect the output of the perception modules in simulation, leading to potentially different ego behaviour. Such differences in behaviour limit how useful these simulations can be in assessing real world performance. Furthermore, running photorealistic simulations of the many miles necessary to verify the safe behaviour of an autonomous vehicle is expensive. This is because rendering photorealistic scenes is a slow, compute-intensive task requiring GPUs. High-fidelity simulation is difficult and expensive, and the conclusions from tests conducted using a high-fidelity simulation are unlikely to generalise to the real world.

Figure 1:
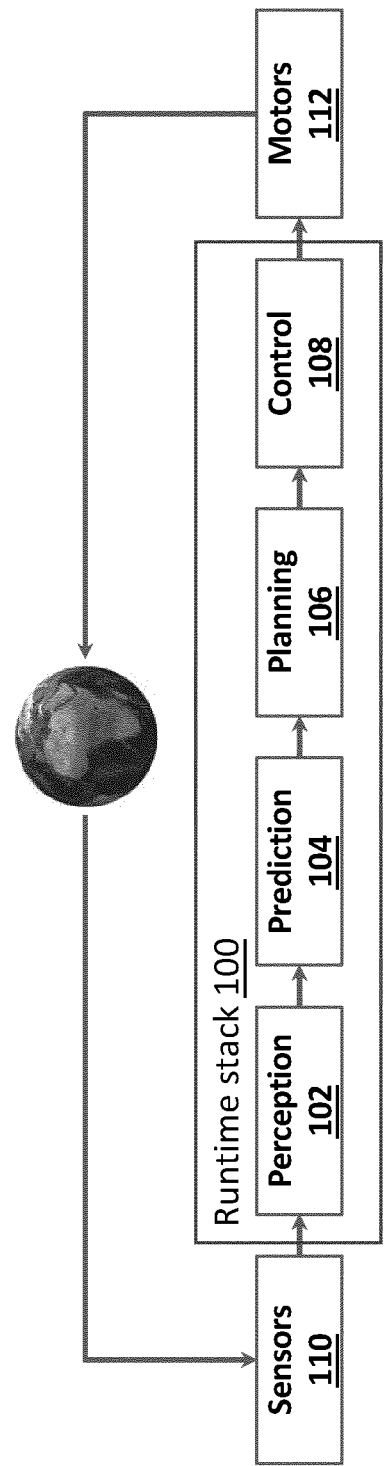
FIG. 1 shows a schematic block diagram of an autonomous vehicle runtime stack.

FIG. 1 shows a diagram of data flow through a decomposed autonomous vehicle stack 100. A perception system 102 receives sensor readings from the world and outputs a scene representation. A planning and prediction system (denoted separately by reference numerals 104 and 106) takes the scene representation and plans a trajectory through the scene. A control system 108 outputs control signals to the world that will cause the vehicle to follow the trajectory.

The perception system 102, planning and prediction system 104, 106 and control system 108 communicate with each other using well-defined interfaces. The perception system 102 consumes raw sensor data and processes it into a more abstract scene representation. This representation includes dynamic object pose, extent, motion and detection confidence. The planning and prediction system predicts the likely trajectories of other agents in the scene and plans a path through the scene that is safe, legal and comfortable. The control system consumes desired trajectories from the planning and prediction system and outputs control signals for the actuators.

In many cases, particularly in the case of the interface between perception and planning, these internal interfaces are easier to simulate than sensor readings. These interfaces may be leveraged for a second kind of simulation called low-fidelity simulation. It is possible to simulate only those aspects of the world that are necessary to reconstruct the abstract scene representation used by the planner, and feed that abstract scene representation directly to the planner, taking the perception system out of the loop. This avoids some of the burdens of high-fidelity simulation, but presents a new challenge: replicating the behaviour of the perception system. It is known that the perception system is not perfect and that its errors affect the prediction, planning and control systems in meaningful ways. Because the results of tests in simulation should generalise to the real world, it is necessary to be able to simulate realistic perception outputs.

An approach is presented for simulating realistic perception outputs using models called PRISMs. A PRISM is a distribution over plausible perception outputs given some low-fidelity scene representation. The mathematical framework that guides the creation of PRISMs is outlined, a prototype is created, and modelling choices are documented. Doing this demonstrates that the modelling approach is sensible.

In summary, in high-fidelity simulation, the world is replaced with a simulator, treating the entire vehicle stack as a black box. In low-fidelity simulation, the world and the perception system 102 are replaced (see FIG. 4 and description below).

FIG. 1 shows a highly schematic block diagram of a runtime stack 100 for an autonomous vehicle (AV). The runtime stack 100 is shown to comprise a perception stack 102, a prediction stack 104, a planner 106 and a controller 108.

The perception stack 102 receives sensor outputs from an on-board sensor system 110 of the AV.

The on-board sensor system 110 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LiDAR, RADAR etc.

The perception stack 102 comprises multiple perception components which co-operate to interpret the sensor outputs and thereby provide perception outputs to the prediction stack 104.

The perception outputs from the perception stack 102 are used by the prediction stack 104 to predict future behaviour of the external actors.

Predictions computed by the prediction stack 104 are provided to the planner 106, which uses the predictions to make autonomous driving decisions to be executed by the AV in a way that takes into account the predicted behaviour of the external actors.

The controller 108 executes the decisions taken by the planner 106 by providing suitable control signals to on-board motors 112 of the AV. In particular, the planner 106 plans manoeuvres to be taken by the AV and the controller 108 generates control signals in order to execute those manoeuvres.

Figure 2:
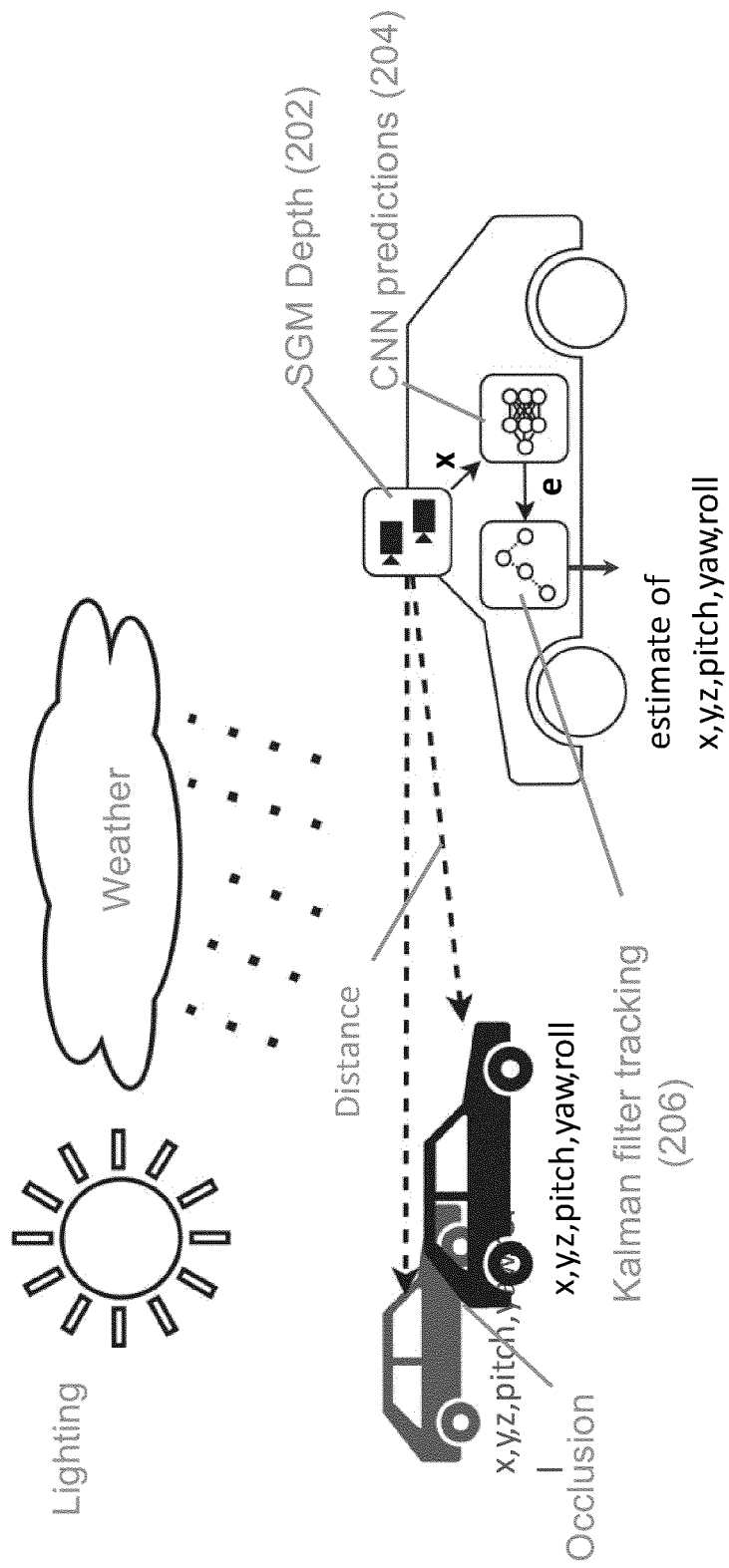
FIG. 2 shows an example of a real-world driving scenario.

FIG. 2 shows an example of certain perception components which might form part of the perception stack 102, namely a 3D object detector 204 and a Kalman filter 206.

A depth estimator 202 captures stereo image pairs and applies stereo imaging (such as Semi-Global Matching) to extract depth estimates therefrom. Each depth estimate is in the form of a depth map, which assigns depth values to pixels of one image of the stereo image pair from which it is derived (the other image is used as a reference). The depth estimator 202 comprises a stereo pair of optical sensors and a stereo processing component (hardware and/or software) which are not shown separately. Both the optical sensors and the stereo processing component of the depth estimator 202 are considered part of the on-board sensor system 110 according to the terminology used herein (not the perception stack 102). The depth maps are one form of sensor output provided to the perception stack 102.

The 3D object detector 204 receives the depth estimates and uses them to estimate poses for external actors in the vicinity of the AV (ego vehicle). Two such external actors are shown, in the form of two other vehicles. Pose in this context means 6D pose, i.e. (x,y,z,pitch,roll,yaw), denoting the location and orientation of each external actor in 3D space.

FIG. 2 is highly simplified for the purposes of illustration. For example, it may be that the 3D object detector is formed of multiple cooperating perception components which collectively operate on sensor outputs of multiple sensor modalities. The application of PSPMs to more complex stacks is described later. For the time being, in order to illustrate certain core principles of PSPMs, a simplified example is considered in which the 3D object detector is assumed to operate on sensor outputs of a single modality (stereo depth).

In a real-world scenario, multiple physical conditions can influence the performance of the perception stack 102. As indicated, a physical condition which is treated as a variable in respect of a particular PSPM is referred to as a "confounder". This allows variable physical conditions that are statistically relevant to a particular perception slice to be accounted for.

Figure 3:
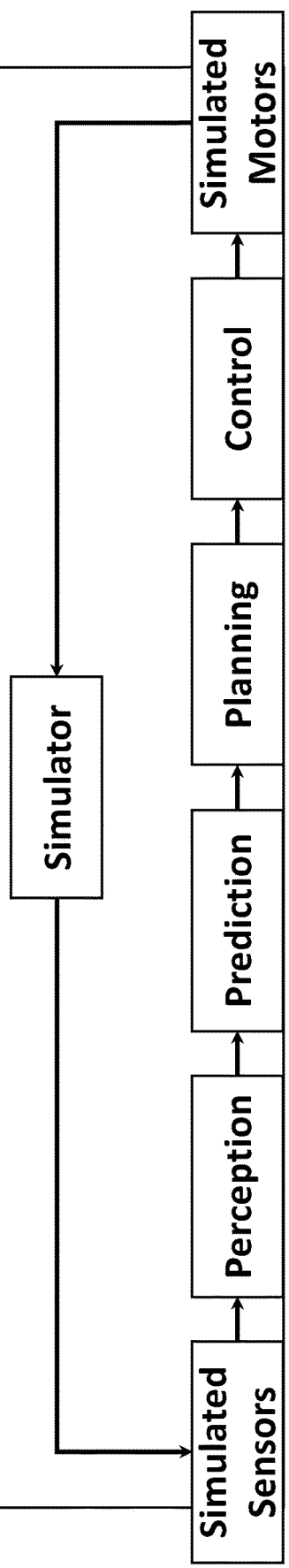
FIG. 3 shows a testing pipeline using photorealistic simulation.

As mentioned, one approach to simulation would be to attempt photorealistic simulation of not only the entire runtime stack 100 of FIG. 1 but also the on-board sensor system 110 and the motors 112. This is illustrated in FIG. 3. A challenge in this scenario is the simulation of sensor data: certain types of sensor data (e.g. RADAR) are inherently very difficult to simulate well and, whilst other types of sensor data (image data) are relatively easier to simulate, certain perception components, such as CNNs, are highly sensitive to even minute deviations from actual sensor data. Another challenge is the significant computational resources required both to simulate sensors and to run complex perception components such as CNNs.

For example, for the arrangement of FIG. 3, it would require extremely high-quality depth maps to be simulated and the 3D object detector 204 to be run on those simulated depth maps. Even miniscule deviation in the simulated depth maps (compared to real depth maps provided the stereo depth estimator 202) could significantly impact the performance of the 3D object detector 204 during the simulation.

Figure 4:
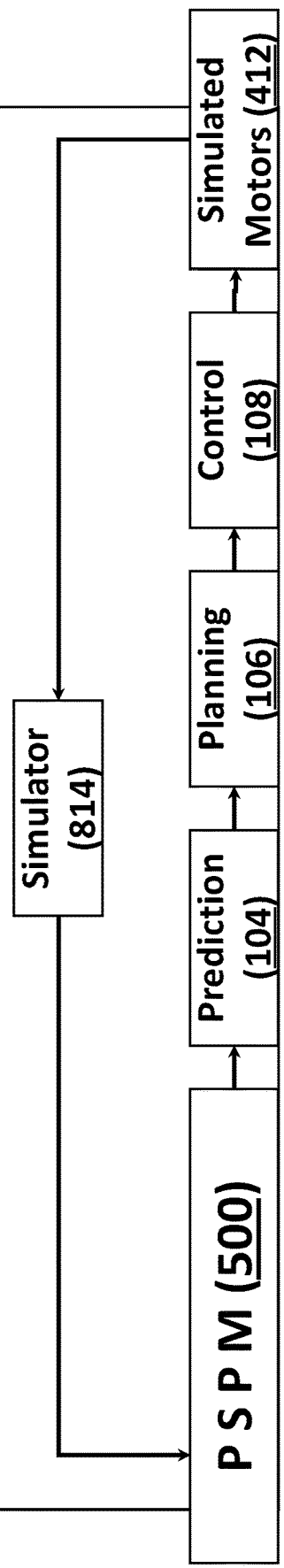
FIG. 4 shows an alternative PSPM-based testing pipeline in accordance with the present disclosure.

FIG. 4 provides a high-level schematic overview of PSPM based simulation. In this case a "headless" simulator set up is used, without the need to create simulated sensor data (e.g. simulated images, depth maps, LiDAR and/or RADAR measurements etc.), and without applying the perception stack 102 (or at least without applying it in full—see below). Instead, one or more PSPMs are used to efficiently compute realistic perception outputs, which in turn feed into higher-level components of the runtime stack 100 and are processed as they would be at runtime.

A PSPM is said to model a "perception slice" which can be all or part of the perception stack 102. A perception slice can be a single perception component or multiple cooperating perception components.

Mathematically, a perception slice may be represented as a function F where $$e=F(x),$$

e being a perception output of the perception slice and x being a set of sensor outputs on which the perception component(s) operate.

On the AV at runtime, e is determined by applying F to x, which in turn is given by a sensor(s).

A PSPM mapped to a confounder space C may be represented as a function p where $p(e|t,c)$ represents a probabilistic uncertainty distribution that provides the probability of F computing a perception output e given a perception ground truth t and a set of one or more confounders c (i.e. given a particular set of possible real-world conditions represented by the point c in the confounder space C)

For example, for 2D bounding box detection:
F may be a CNN
x may be an RGB image
t could be a ground truth bounding box which can be computed directly from the simulation using ray tracing (without simulating x and without applying F), or a set of multiple such bounding boxes for multiple ground truth objects (set-to-set approach)
c might be distance and/or weather etc.

In the example of FIG. 2, e represents one or more 6D pose vectors computed by the 3D object detector 204 and x represents a depth map provided by the stereo depth estimator 202 from which e is derived.

Figure 5:
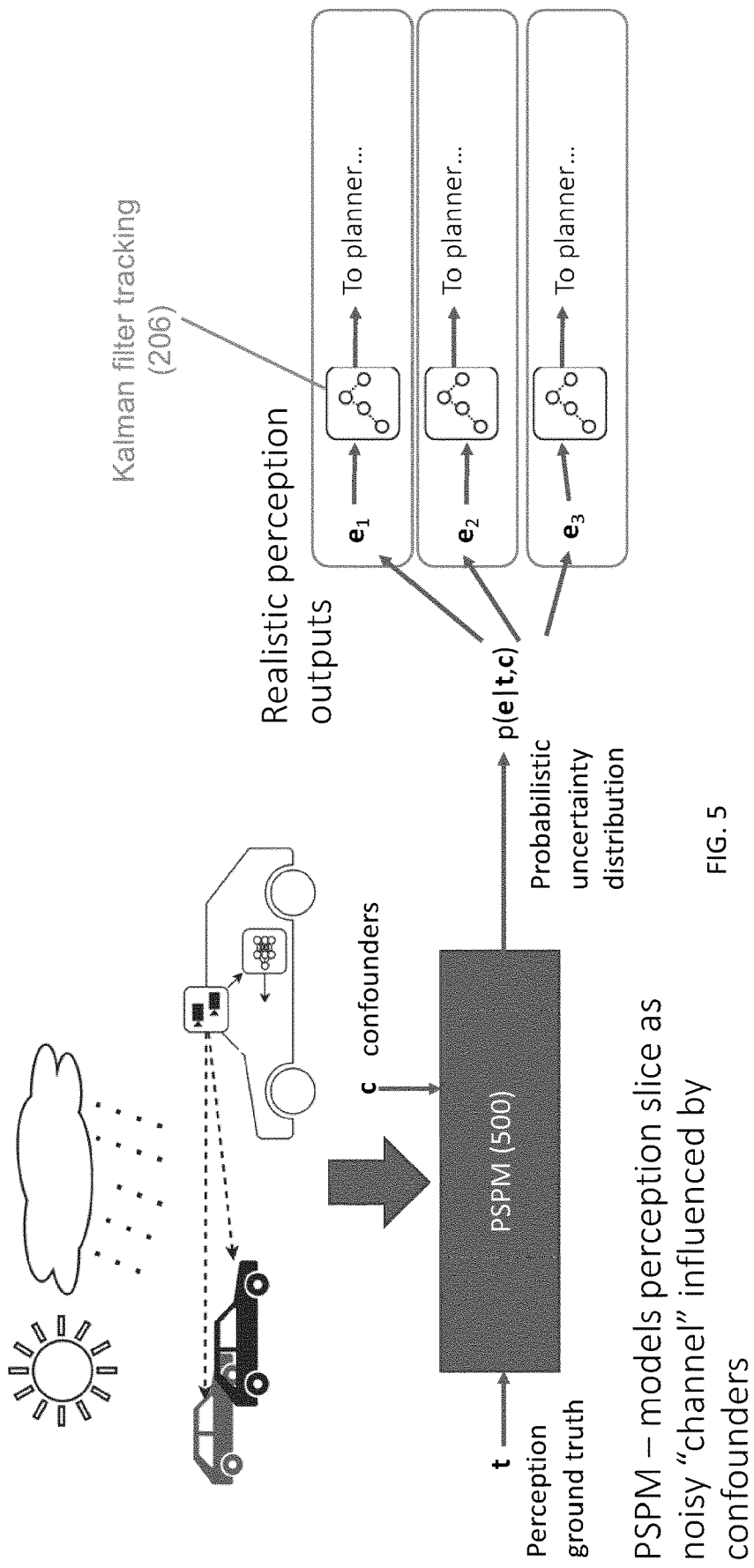
FIG. 5 shows how perception performance may be influenced by confounders.

FIG. 5 shows how a PSPM may be used to simulate realistic perception outputs for the scenario of FIG. 2. In this case, the perception slice is the 3D object detector 204.

Realistic in the present context refers to perception outputs which are more realistic than the perception ground truths.

A PSPM 500 is provided which essentially models the perception slice 204 as a noisy "channel" which is influenced both by the characteristics of the stereo depth estimator 202 and also the physical environment. The physical environment is characterized by a set of confounders c which, in this example, are: lighting, weather, occlusion and distance to each external actor.

In order to apply the PSPM 500, a perception ground truth can be computed directly from a simulated scenario under consideration. For example, in a simulated scenario in which a simulated AV (ego vehicle) has a number of external actors in its vicinity, a 6D pose ground 450 truth can be determined by directly computing the 6D pose of each external actor in the ego vehicle's frame of reference.

The PSPM 500 then uses the computed ground truth t to compute the distribution $p(e|t,c)$. Continuing the above example, this would provide, for each simulated external actor, the probability that the actual 3D object detector 204 would compute perception output e 455 [estimated 6D pose(s) of the external actor(s)] given perception ground truth t [the "actual" 6D pose(s)] in a real-world scenario characterized by the same confounders c.

Having computed p(e|t,c), it can be used to run multiple simulations for a range of realistic perception outputs (PSPM samples) obtained by sampling p(e|t,c). Realistic means of sufficiently high probability according to p(e|t, c)—noting that it may well be desirable to test 460 relatively low probability perception outputs (outliers) provided they are still realistic. The extent to which outliers are tested will depend on the level of safety the AV is required to meet.

In FIG. 5, three realistic perception outputs $e_1$, $e_2$, $e_3$ are shown by way of example. These are sampled from p(e|t,c).

One approach would be to sample perception outputs from p(e|t,c) in a way that favours the most probable perception outputs, e.g. using Monte Carlo sampling. This would, broadly speaking, test a larger number of the most probable perception outputs and fewer less probable outputs.

However, whilst this may be useful in some contexts, in others it may be more useful to deliberately test a greater number of "outliers", i.e. less probable but still realistic perception outputs, as it may be that outliers are more likely to cause or contribute to unsafe behaviour. That is, p(e|t,c) may be sampled in a way that is deliberately biased towards outliers to deliberately make a particular scenario more "challenging" or "interesting" as it progresses. This could be implemented by transforming the distribution of the PSPM and sampling from the transformed distribution.

Figure 6:
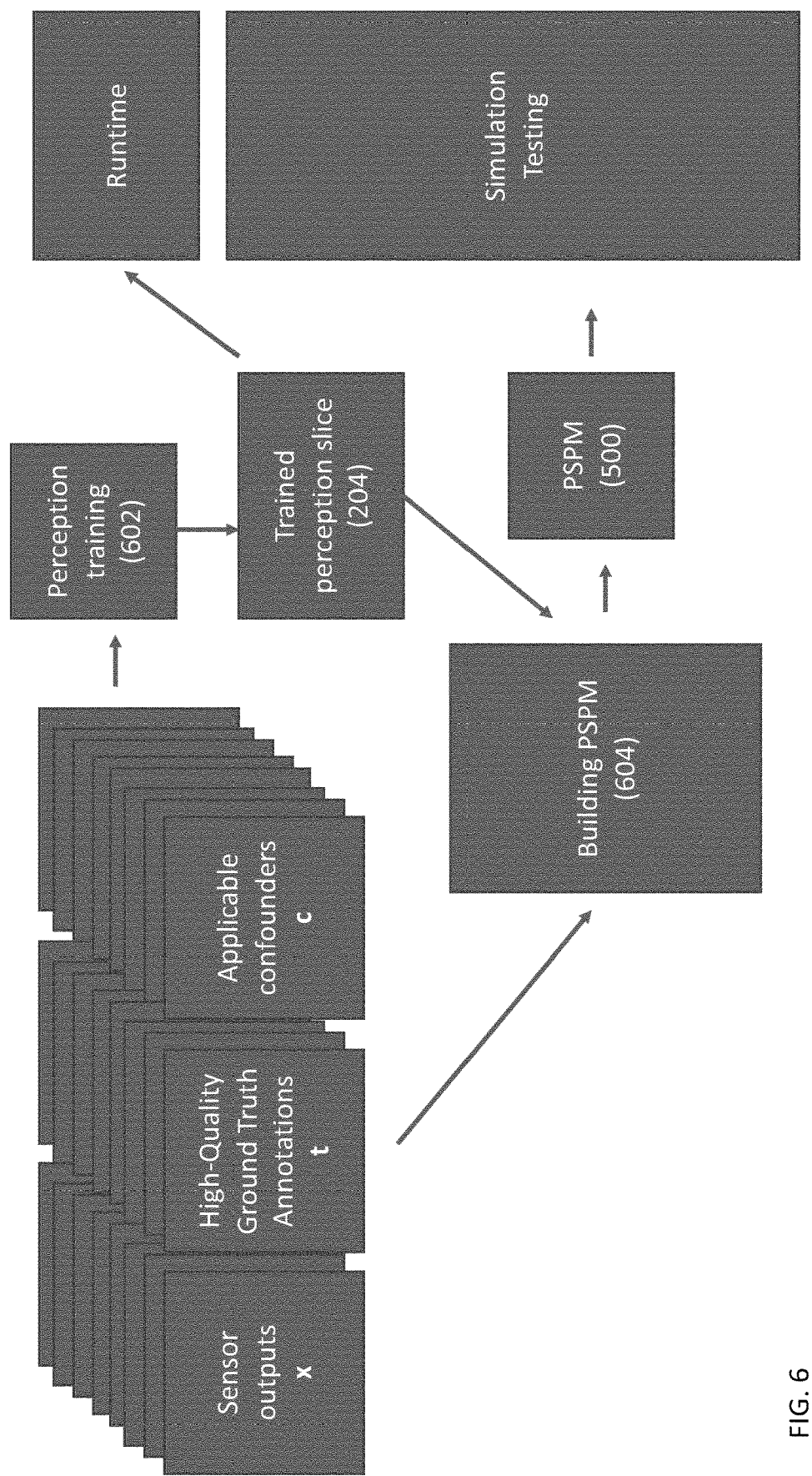
FIG. 6 provides a high-level overview of certain principles of PSPM-based safety testing.

FIG. 6 provides an overview of a process of building a PSPM. A vast number of real sensor outputs x are collected and annotated with perception ground truths t. This exactly the same process as used to generate training data for training the perception components of the perception stack 102 (denoted by block 602)— and a first subset of the annotated sensor outputs are used for this purpose. A trained perception slice 204 is shown, which is executed at run-time (in the real-world) and for the purpose of building a PSPM 500 which will model that perception slice 204 at simulation.

Continuing the example of FIG. 2, the real sensor outputs would be depth maps and the ground truths would be ground truth 6D poses of any objects captured in the depth map. Such annotated data is used not only to train the 3D object detector 204 (the perception slice in this example), but is also used to build the PSPM 500 which models the 3D object detector 204 during simulation.

Block 604 denotes PSPM building (training) and a second subset of the annotated sensor outputs is used for this purpose. Each sensor output is additionally annotated with a set of confounders c which characterize the physical conditions in which it was captured in the real-world. A large number of sensor outputs are needed for every set of confounders c that the PSPM needs to be able to accommodate. For full "level 4" autonomy, this means capturing and annotating sensor outputs across the whole ODD.

A PSPM 500 can take the form of a parametric distribution $$Dist(t,c;\theta)$$

where t and c are variables on which the distribution depends and $\theta$ is a set of learned parameters.

The parameters $\theta$ are learned as follows:
1) Apply the trained perception slice 204 to each sensor output x to compute a corresponding perception output e;
2) For each perception output e, determine a deviation (error) $\Delta$ between e and the corresponding ground truth t;
3) Each error $\Delta$ is associated with the ground truth t and the set of confounders c pertaining to the corresponding sensor output x;
4) Tune the parameters $\theta$ to fit the distribution to the errors $\Delta$, taking into account the associated ground truths and variable confounders c.

As will be apparent, various known forms of parametric distribution/model can be applied in this context. Therefore the details are not described further.

More generally, the training set used for PSPM training is made up of perception ground truths (from manual, automatic or semi-automatic annotation), and corresponding actual perception outputs generated by the perception slice 204 to be modelled. The aim in training is to learn mappings between perception ground truths and perception output distributions that capture the statistics of the actual perception outputs. Hence, perception outputs sampled from the distribution p(e|t) for a given ground truth t will be statistically similar to the actual perception outputs used for training.

As one example, the perception slice 204 could be modelled as having zero-mean Gaussian noise. It is emphasised, however, that the present disclosure is not limited in this respect. PSPMs may well take the form of more sophisticated non-Gaussian models.

In the case of a Gaussian, the PSPM 500 could, for example, be characterized as:

$$e = t + \varepsilon$$

$$\varepsilon \sim N(0, \Sigma(c)),$$

where $N(\theta, \Sigma(c))$ denotes a Gaussian distribution having zero-mean and a covariance $\Sigma(c)$ that varies as a function the confounders c. During simulation, noise would then be sampled from the Gaussian and added to the perception ground truths. This would be dependent on the variance of the Gaussian, and hence on the confounders applicable to the simulated scenario.

Example PSPM Error Dataset

Figure 7:
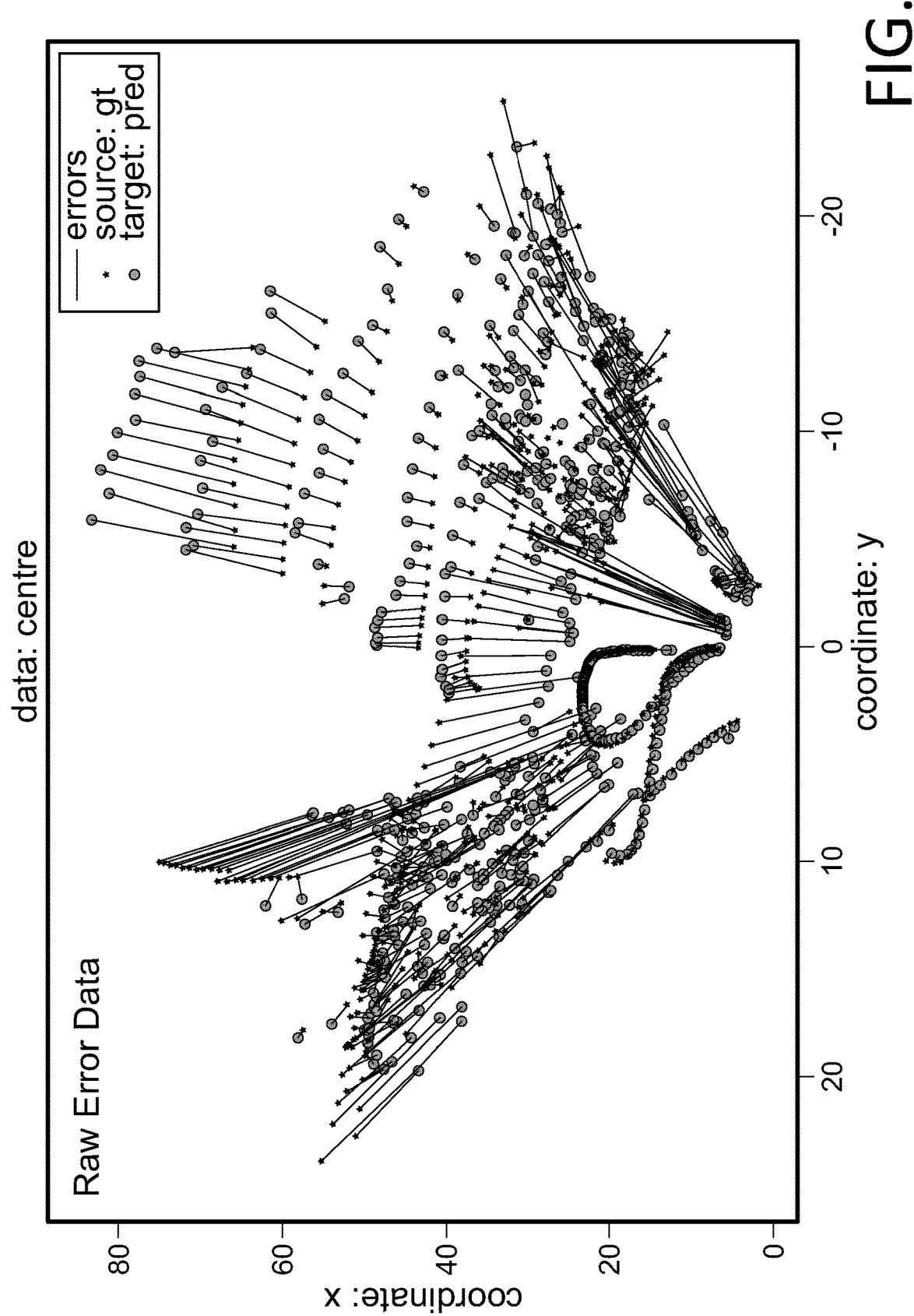
FIG. 7 shows a perception error dataset which may be used to train a PSPM.

FIG. 7 shows an example of a raw error plot for a two-dimensional prediction space—e.g. each point could correspond to an (x,y) coordinate that might be estimated by a 2D object detector. Each prediction e is represented by a circle and each ground truth t is represented by a star. Each error $\Delta$ is represented by a line segment between the corresponding prediction e and the corresponding ground truth t (a longer line segment denotes a larger error).

In order to build a PSPM, the aim would be to tune a parametric distribution in a way that accurately captures the error relationships between the data points of FIG. 7 in probabilistic terms (the data points being the errors $\Delta$ in this context), taking into account the variable confounders c.

Figure 7A:
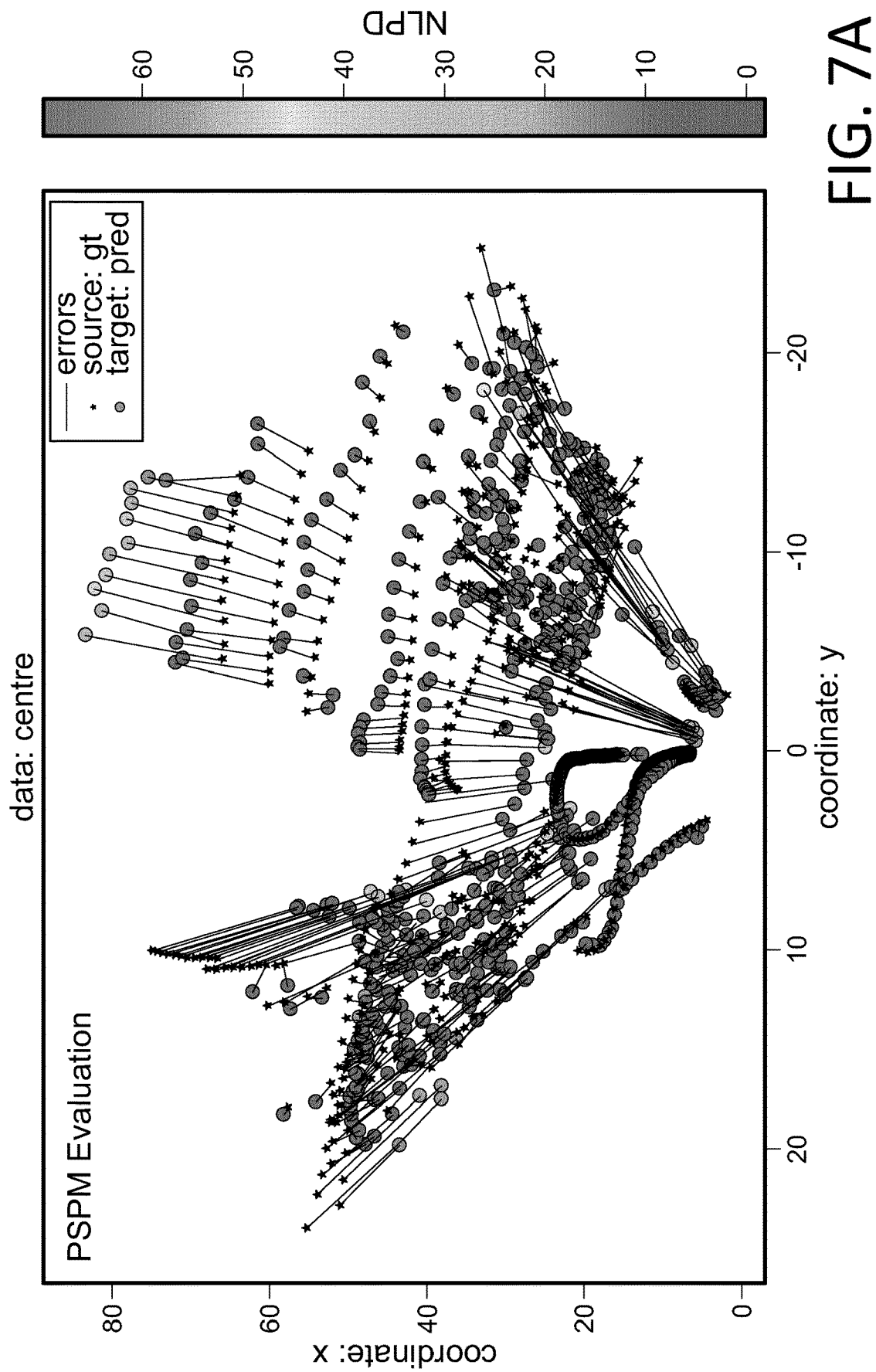
FIG. 7A shows results of a trained PSPM applied to the perception error dataset of FIG. 7.

FIG. 7A shows the results of a trained PSPM applied to the error dataset of FIG. 7.

Choosing Confounders

Decisions about which confounder to incorporate are driven by observation: when it can be seen that a particular physical property/condition is having a material effect on perception uncertainty, that could be a trigger to introduce that as a confounder variable into the applicable PSPM(s). Only confounders which are statistically relevant should be introduced.

One approach to confounders is to divide the error dataset according to confounders, and train a separate model for each division of the dataset. To take a very simple example, two confounders might be "lighting" and "weather" each of which can take a binary "good/poor" value. In this case, the dataset may be divided into four subsets having (lighting, weather)=(good, good), (good, bad), (bad, good) and (bad, bad) respectively, and four separate models may be trained for each subset. In that case, the PSPM is made up of four models, with the confounder variable c=(lighting, weather) acting as an index that determines the choice of model.

Confounder variables may also be incorporated directly into the perception error model. For example, in the set-to-set PSPM described later, occlusion rate is included in the definition of the ground-truth inputs, and the model for true positives can be defined to depend on the occlusion rate. The different ways in which confounders may be treated in the context of PSPMs are described in more detail later.

Engineering Pipeline Architecture

Figure 8:
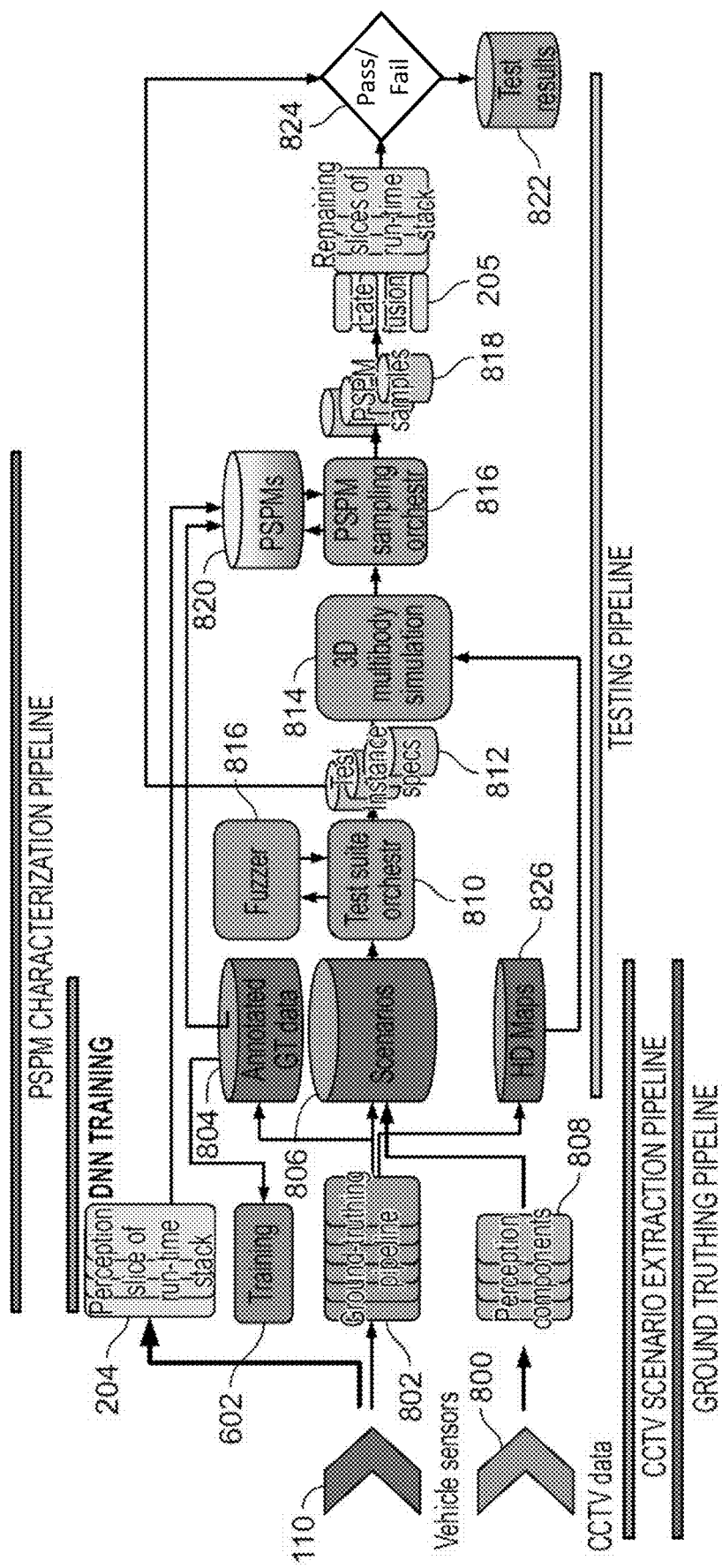
FIG. 8 shows an engineering pipeline which incorporates PSPMs.

FIG. 8 shows a highly schematic overview of an engineering pipeline which incorporates PSPMs. The overall pipeline covers everything from data collection, annotation and extraction; training of perception components; PSPM characterisation and simulation-based testing.

A large number of sensor outputs, such as stereo images, depth maps, LiDAR measurements and RADAR measurements, are collected using a fleet of vehicles each equipped with a sensor system 110 of the kind described above. These are collected in the kind of environments and driving scenarios that an AV will need to be able to handle in practice, for example in target urban areas in which deployment of AVs is desired. The collecting vehicles themselves can be AVs or they can be manually-driven vehicles equipped with similar sensor systems.

A ground-truthing pipeline 802 is provided for the purpose of annotating the captured sensor outputs with ground truths. This includes the annotation of sensor outputs with perception ground truths of the kind described above. Sensor outputs annotated with perception ground truths are stored in an annotated ground truth database 804. Further details are described below.

Additionally, sensor outputs captured by the vehicle fleet are also used to extract driving scenarios which can then be re-created in a simulator. Driving scenarios are captured using a high-level structured scenario description language and are stored in a scenarios database 806.

Sensor outputs captured from the vehicle fleet are not the only source of information from which driving scenarios can be extracted. In addition, CCTV (closed circuit television) data 800 is used as a basis for scenario extraction, typically CCTV data captured in urban environments showing, for example, challenging urban driving scenarios such as complex roundabouts. This provides a rich source of challenging driving scenarios which, in turn, provides an excellent basis for safety testing. A set of back-end perception components 808 are used to process the CCTV data 800 to assist in the process of extracting driving scenarios therefrom, which in turn are also stored in the scenarios database 806 in the scenario description language format.

Further details of the scenario description language and the process of extracting scenarios from CCTV data and other data may be found in United Kingdom Patent Application No. 1816852.6, which is incorporated herein by reference in its entirety.

A driving scenario captured in a scenario description language format is a high-level description of a driving scenario. A driving scenario has both a static layout, such as road layout (lanes, markings etc.), buildings, road infrastructure etc. and dynamic elements. In the pipeline of FIG. 8, static layout is captured in a scenario description as a pointer to an HD (high definition) map, stored in a map database 826. The HD maps themselves may be derived from the annotated sensor outputs collected by the fleet of AVs and/or from CCTV.

Dynamic elements include, for example, positions and movement of actors within the static layout (e.g. vehicles, pedestrians, cyclists etc.) and are captured in the scenario description language.

Running Simulations

A test suite orchestration component 810 uses the captured driving scenarios to formulate test instance specifications 812, which in turn can be run in a 3D simulator 814 as 3D multibody simulations. The purpose of these simulations is to enable accurate perception ground truths to be derived, to which PSPMs are then applied. Hence, they contain a sufficient level of 3D geometric detail to be able to derive e.g. ground truth 3D bounding boxes (size, 6D pose of external actors in the frame of reference of the ego vehicle), odometry and ego-localization outputs etc. However, they are not photorealistic simulations, because that level of detail is not required. They also do not attempt to simulate conditions such as rain, lighting etc. because those are modelled as the confounders c.

To provide greater variation of scenarios, a scenario "fuzzer" 820 is provided which can fuzz scenarios in the above sense. Fuzzing a scenario means altering one or more variables of the scenario to create a new scenario that is still realistic.

Typically, this would involve fuzzing dynamic elements into the static scene, for example, changing the motion of external actors, removing or adding external actors etc.

However, the static layout may also be fuzzed, for example to change the curvature of the road, change the location of static objects, change road/lane markings etc.

The training block 802 of FIG. 8 is shown to have access to the annotated ground truth data database 804, which, as noted, is used for the purpose of training the perception slice(s) 204 of the runtime stack 100.

As noted above and shown in FIG. 8, the perception slice 204 is not necessarily the entirety of the perception stack 102. In this example, the perception stack 102 is "sliced" before a final set of fusion components (filters) which co-operate to fuse perception outputs from lower down the perception stack 102. These form part of one or more remaining perception slices 205, which are not modelled using PSPMs but are applied to PSPM samples. The outputs of the final (unmodelled) perception slice(s) 205 feed directly into the prediction stack 104.

The PSPMs are shown to be stored in a PSPM database 820.

Running Simulations

A PSPM sampling orchestration component 816 uses 3D multibody simulations in the 3D simulator 814 to derive ground truths, which in turn form inputs to the one or more PSPMs used to model the perception slice 104 PSPM and provide PSPM samples 818 for each simulation. The PSPM samples 818 are fed into the remainder of the runtime stack 100, i.e. into the final set of filters 205 in this example, and used as a basis for planning and prediction, ultimately causing the controller 108 to generate control signals that are provided to a set of simulated AV motors.

The simulated motors are not shown in FIG. 8 but are shown in FIG. 4 and are denoted therein by reference numeral 412. As indicated in FIG. 4, the 3D multibody simulation in the 3D simulator is driven in part by the simulated motors. These determine how an agent (simulated in this case) moves within the static layout (i.e. they determine changes in the agent's state, which may be referred to herein as a simulated robot state). The behaviour of the agent, in turn, might also influence the behaviour of simulated external actors as they respond to the AV's motion. As the 3D simulation progresses, new perception ground truths continue to be derived and fed to the PSPMs 500 in an iterative manner until the simulation completes.

Each completed simulation is logged as a set of test results stored in a test database 822.

Note, the same scenario can be run multiple times and will not necessarily yield the same results. This is due to the probabilistic nature of PSPMs: each time the scenario is run, different PSPM samples may be obtained from the PSPMs. A significant amount of information can therefore be gained by running the same simulated scenarios on multiple occasions and observing, for instance, the extent to which the simulated agent behaves differently in each instance of that scenario (a large discrepancy in the agent's behaviour indicates that the effect of perception errors is significant), or the proportion of scenario instances in which the agent behaves unsafely. If the same scenario is run a large number of times and the agent behaves safely and very similarly in each scenario, that indicates that the planner 106 is able to plan properly under uncertainty in that scenario.

Test Oracle

The driving scenarios used as a basis for the simulation are generally based on real-world scenarios or fuzzed real-world scenarios. This ensures that realistic scenarios are being tested. Note however that these are generally driving scenarios that have not involved any actual autonomous vehicles, i.e., for the most part at least, the driving scenarios that are tested are derived from real-life instances of human driving. There is therefore no way of knowing which scenarios are likely to result in failure.

For this reason, a scenario assessment component 824, referred to herein as the "test oracle" is provided and has the role of assessing, once a simulation has completed, whether the simulated AV behaved acceptably in that scenario or not. The output of the test oracle 824 can include a simple binary (yes/no) output to flag whether or not the AV behaved safely, or it can be a more complex output. For example, it may include a risk score.

In order to do this, the test oracle 824 applies a set of predetermined rules which may be referred to herein as a "Digital Highway Code" (DHC). In essence, this hard-codes the rules that define safe driving behaviour. If the scenario is completed without violating those rules, then the AV is deemed to have passed. However, if any of those rules is breached, then the AV is deemed to have failed and this is flagged as an instance of unsafe behaviour that requires further testing and analysis. Those rules are encoded at an ontological level so that they may be applied to an ontological description of the scenario. The concept of ontology is known in the field of robotics and, in the present context, aims to characterise the driving scenario and the behaviour of the simulated AV in that scenario at the same level of abstraction so that the DHC rules can be applied by the test oracle 824. The results of the analysis may quantify how well the agent performed with respect to the DHC e.g. the extent to which rules are violated (e.g. a rule might specify a certain distance from a cyclist should always be maintained, and the results may indicate the extent to which this rule was violated, and the circumstances in which it was violated).

An instance of unsafe behaviour can also be flagged as one in which a "disengagement" was necessary. For example, this could be where a failover mechanism within the runtime stack 100 was activated in order to prevent a crash or some other critical failure (just as it would have been in that scenario in the real-world).

The present techniques are not limited to detecting unsafe behaviour. Behaviour may be assessed with respect to other metrics, such as comfort, progression etc.

Example Perception Stack

Figure 9:
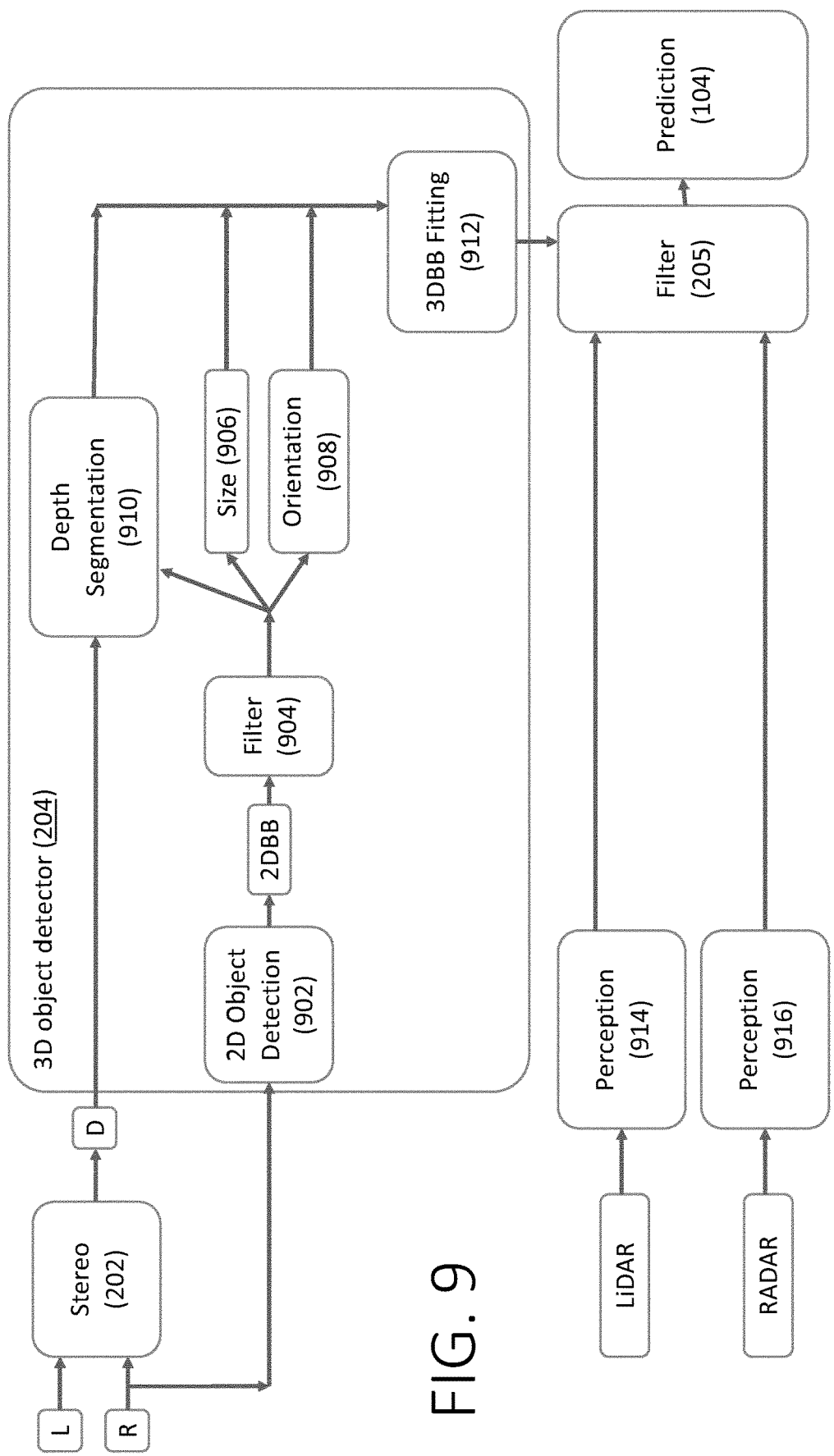
FIG. 9 shows an example of a perception stack.

FIG. 9 shows a schematic block diagram of part of an example perception stack. A 3D object detector is shown and denoted by reference numeral 204, which in turn is shown to comprise a 2D object detector 902, a 2D tracker filter 904, a size estimation component 906, an orientation estimation component 908, a depth segmentation component 910 and a template fitting component 912. This represents one example architecture for the 3D object detector 204 referred to above and shown in the earlier figures.

The 2D object detector receives one image of each captured stereo image pair (the right image R in this example) and applies 2D object detection to that image. The output is a 2D bounding box for each object detected in the image. This provides a 2D (x,y) location of each object in the image plane and a bounding box indicating the size of the projection of the object into the image plane. The 2D tracking filter 904 receives the 2D bounding box outputs and applies filtering to them in order to refine the 2D bounding box estimations. This filtering may for example take into account previous 2D detected bounding boxes and expected behaviour of the detected objects, based on an object behaviour model. The filtered 2D bounding boxes and the image data of the original image contained therein are used for a number of different purposes thereafter. The 2D object detector 902 can take the form of a trained CNN.

The depth segmentation component 910 receives the filtered 2D bounding boxes and also receives the depth map extracted from the original stereo image pair by the stereo estimator 202. It uses the filtered 2D boxes to isolate depth points belonging to each object within the depth map. This is a form of depth segmentation.

The size estimation component 906 also receives the filtered 2D bounding boxes and uses them to estimate a 3D size of each detected object based on the image data of the right image contained within the 2D bounding box.

The orientation estimation component 908 similarly receives the filtered 2D bounding boxes and uses them to determine a 3D orientation of each detected object using the image data of the right image contained within the applicable 2D bounding box. The size estimation component 906 and the orientation estimation component 908 can take the form of trained CNNs.

The 3D template fitting component 912 receives, for each detected object, the isolated depth points for that object from the depth segmentation component 910, the 3D size of that object from the size estimation component 906, and the 3D orientation of that detected object from the orientation component 908. The 3D template fitting component 902 uses those three pieces of information to fit a template, in the form of a 3D bounding box, to the depth points belonging to that object. The 3D size and 3D orientation of the 3D bounding box are both known from the size and orientation estimation components 906, 908 respectively and the points to which the bounding box must be fitted are also known. Therefore, this is simply a case of finding an optimal 3D location for the 3D bounding box. Once this has been done for each object, the 3D size and 6D pose (3D location and 3D orientation) are known for each detected object at a given time instant.

An output from the 3D template fitting component 912 to an input of a final filter 205 is shown. In addition, the final filter 205 is shown having an input to receive perception outputs from LiDAR and RADAR respectively. LiDAR and RADAR perception components are shown and denoted by reference numerals 914 and 916 respectively. Each of these provides perception outputs which can be fused with the perception outputs from the 3D object detector 204, such as 6D pose. This fusion takes place in the final filter 205 and an output of the final filter is shown connected to an input of the prediction stack 104. This could, for example, be a filtered (refined) 6D pose that takes into account all of these stereo, Lidar and radar measurements. It could also take into account expected object behaviour in 3D space as captured in an expected behaviour model for 3D objects.

Slicing of Perception Stack

Figure 9A:
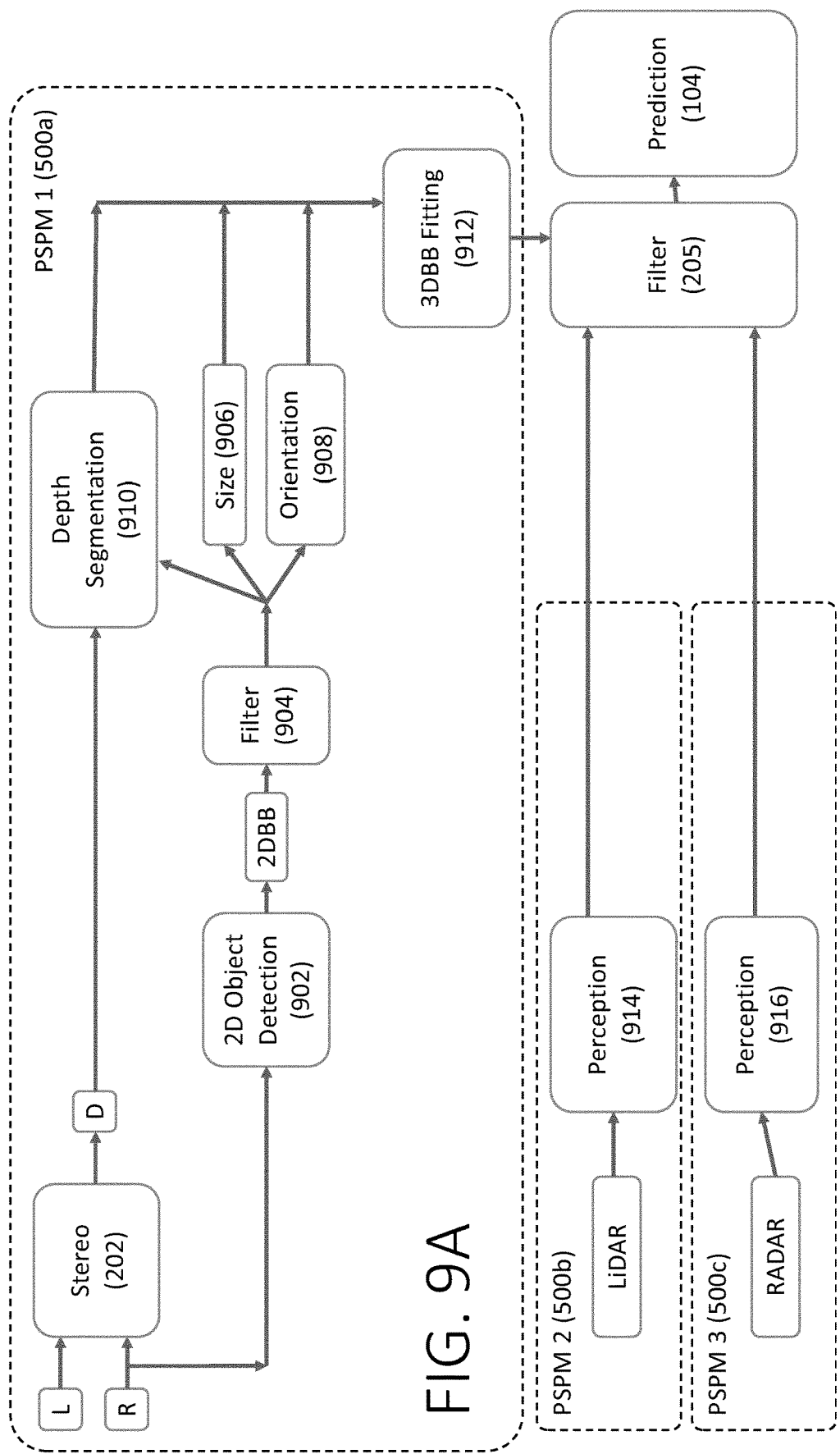
FIGS. 9A-C shows different ways in which the perception stack of FIG. 9 may be modelled using one or more PSPMs.

FIG. 9A shows one example of how the perception stack of FIG. 9 might be "sliced", i.e. modelled as PSPMs. The perception stack 102 is said to be sliced after the final perception component(s) that is modelled by the PSPM and the perception outputs of that perception component(s) may be referred to as the "final outputs" for the PSPM. The distribution of that PSPM will be defined over those final outputs, i.e. e in p(e|t,c) corresponds to those final output(s) of the component(s) after which the perception stack 102 is sliced. All perception components and sensors which provide input(s) to that component(s) (directly or indirectly) will be modelled by that PSPM in terms of their effect on the uncertainty in the final outputs e (and are said to be "wrapped up" in that PSPM).

In this case, a single PSPM is provided for each sensor modality, i.e. one for stereo imaging, a second for LiDAR, and a third for RADAR. The three PSPMs are denoted by reference numerals 500a, 500b and 500c respectively. To build the first PSPM 500a, the perception stack 102 is sliced after the 3D template fitting component 912, hence the distribution of the first PSPM 500a is defined over the perception outputs of the template fitting component 912. All of the perception components and sensors that feed into the 3D template fitting component 912 are wrapped up in that first PSPM 500a. The second and third PSPMs 914, 916 are sliced after the LiDAR and RADAR perception components 914, 916 respectively.

The final filter 205 is not modelled as a PSPM, but it rather is applied to PSPM samples obtained from the three PSPMs 500a, 500b and 500c during testing.

Figure 9B:
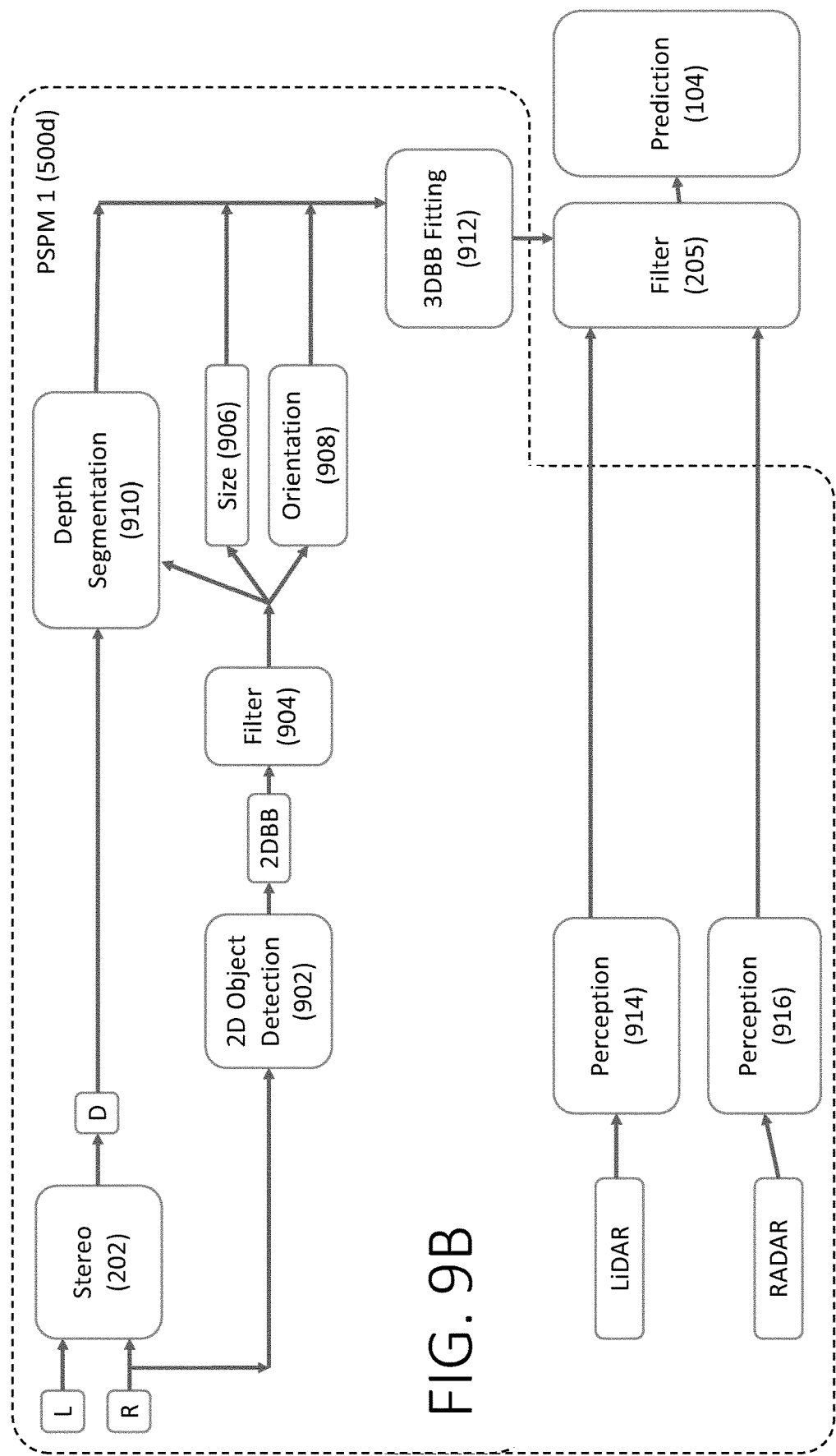

FIG. 9B shows a second example slicing, in which all three sensor modalities are modelled using a single PSPM 500d. In this case, the distribution p(e|t,c) is defined over all three sensor modalities, i.e. e=($e_{stereo}$, $e_{lidar}$, $e_{lidar}$). Therefore, each PSPM sample will include realistic perception outputs for all three sensor modalities. The final filter is still not modelled as a PSPM in this example, and will be applied at testing to PSPM sampled obtained using the single PSPM 500d.

Figure 9C:
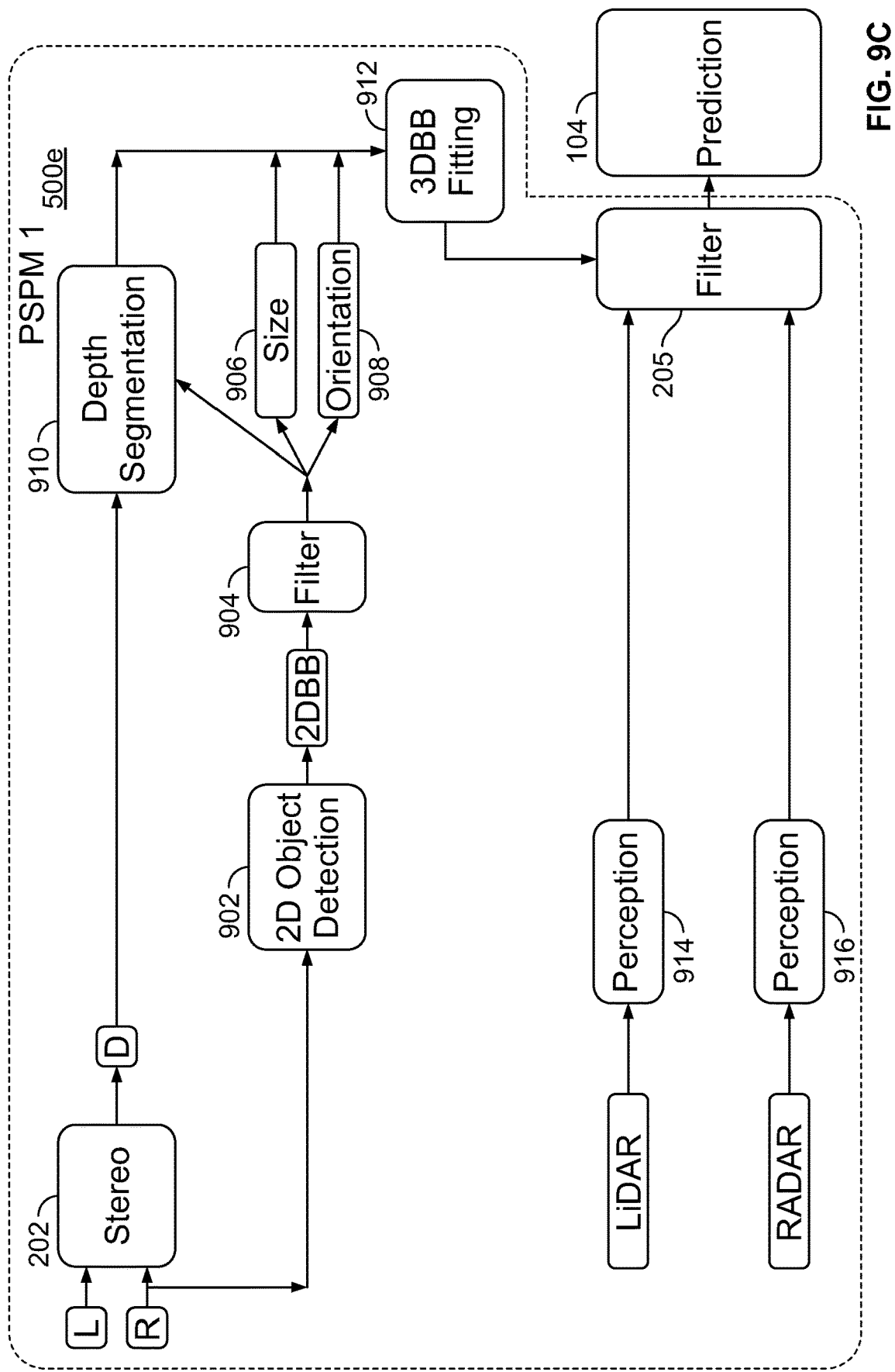

FIG. 9C shows a third example slicing, in which all three sensor modalities together with the final filter 205 are modelled as a single PSPM 500e. In this case, the distribution p(e|t,c) is defined over the filtered perception output of the final filter 205. During testing, the PSPM 500e will be applied to ground truths derived from the simulation, and the resulting PSPM samples will be fed directly to the prediction stack 104.

Slicing Considerations

One factor when deciding where to "slice" the perception stack is the complexity of ground truth that will be needed (the required ground truth will correspond to the perception component(s) after which the stack is sliced): an underlying motivation for the PSPM approach is to have a ground truth that is relatively easy to measure. The lowest parts of the perception stack 102 operate directly on sensor data, however the information needed for planning and prediction is much more high-level. In the PSPM approach, the idea is to "bypass" the lower level details whilst still providing statistically representative perception outputs for prediction and planning during testing. In very broad terms, the higher up the perception stack 102 is sliced, the simpler the ground truths will be in general.

Another consideration is the complexity of the perception components themselves, because any perception components that are not wrapped up in a PSPM will have to be executed during testing.

It is generally expected that slicing always would take place after the CNNs in the perception stack, avoiding the need to simulate inputs to the CNNs and avoiding the need to consume compute resources running the CNNs at testing.

In one sense, it is beneficial to wrap up as much of the perception stack 102 as possible into a single PSPM. In the extreme case, this would imply that the entire perception stack 102 is modelled as a single PSPM. This has the benefit of being able to model any correlations between different sensors and/or perception components, without requiring knowledge of those correlations. However, as more and more of the perception stack 102 is wrapped up in a single PSPM, this significantly increases the complexity of the system being modelled.

For FIG. 9A, each of the individual PSPMs 500a, 500b, 500c can be built independently from data of a single sensor modality. This has the benefit of modularity—existing PSPMs can be rearranged to test different configurations of the perception slice 204 without retraining. Ultimately the optimal PSPM architecture will be context dependent.

Examples of PSPMs

The above description has mainly focused on dynamic objects, but PSPMs can also be used in the same way for static scene detectors, classifiers and other static scene perception components (e.g. traffic light detectors, lane offset correction etc.).

Indeed, PSPMs can be built for any part of the perception stack 102, including:
  odometry, e.g.:
    IMU,
    visual-odometry,
    LIDAR-odometry,
    RADAR-odometry,
    wheel encoders;
  (ego-)localization, e.g.
    vision-based localization,
    GPS localization (or satellite positioning more generally).

"Odometry" refers to the measurement of local relative motion and "Localisation" refers to the measurement of global position on a map.

PSPMs can be built in exactly the same way to model the perception outputs of such perception components, using suitable perception ground truths.

These allow realistic odometry and localization errors to be introduced into the simulated scenarios, in the same way as detection errors, classification errors etc.

Ground-Truthing Pipeline

As noted above, the generation of annotations in the ground-truthing pipeline 802 can be manual, automated or semi-automated annotation.

Automated or semi-automated ground truth annotation can make use of high-quality sensor data that would not normally be available to the AV at runtime (or at least which would not be available all of the time). In fact, this can provide a way to test whether such components are required.

Automated or semi-automated annotation can make use of offline processing to obtain more accurate perception outputs that can be used as ground truths for PSPM building. For example, to obtain perception ground truth for localization or odometry components, offline processing such as bundle adjustment can be used to reconstruct a path of a vehicle to a high level of accuracy, which in turn can be used as ground truth to measure and model the accuracy of the AV's online processing. Such offline processing may not be feasible on an AV itself at runtime because of compute resource constraints or because the algorithms used are inherently non-real time.

Examples of Confounders

Figure 10:
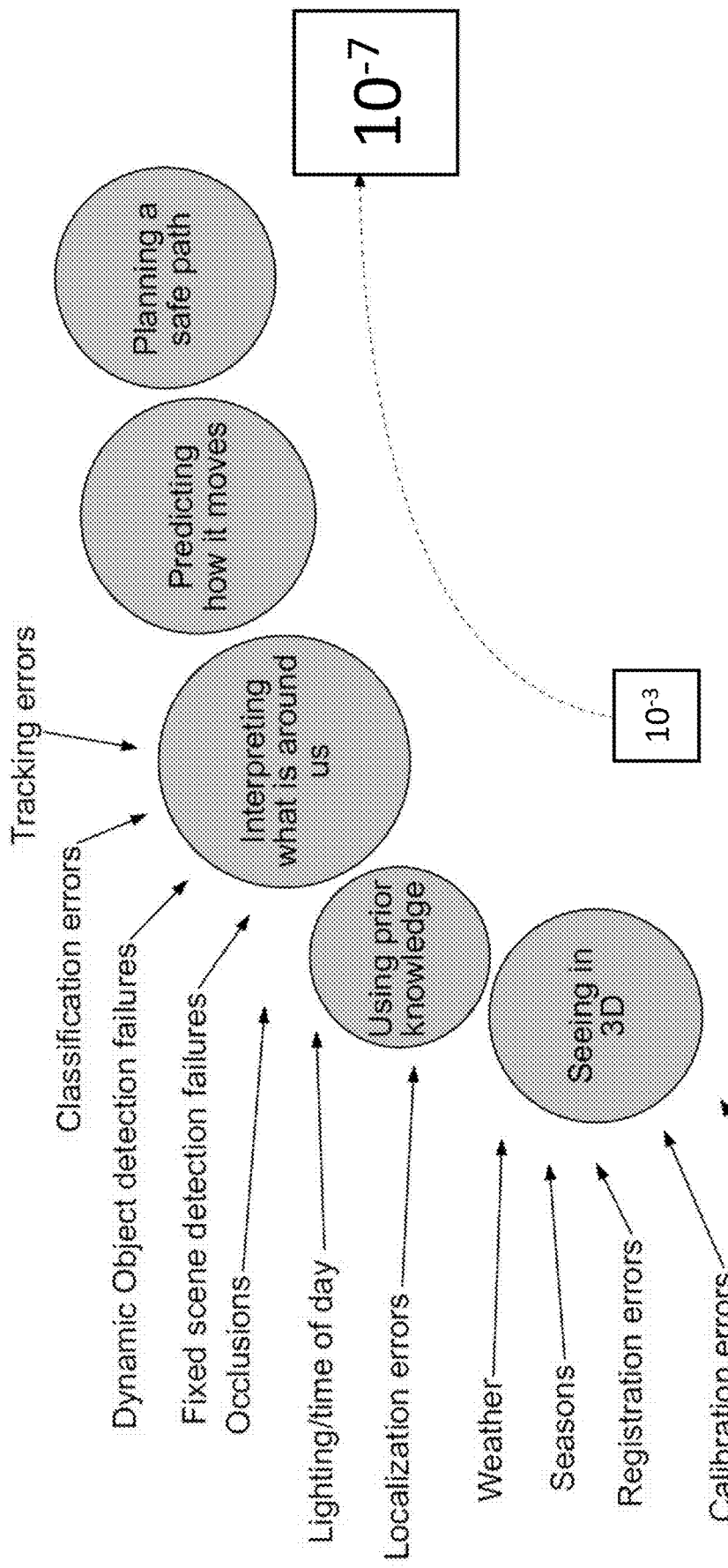
FIG. 10 provides a schematic overview of factors that can contribute to perception uncertainty.

FIG. 10 shows a high-level overview of various factors that can contribute to uncertainty in the perception outputs (i.e. various sources of potential perception error). This includes further examples of confounders c which may be incorporated as variables of a PSPM:

- Occlusions
- Lighting/time of day
- Weather
- Seasons
- Distance to object (linear and/or angular)
- Velocity of object (linear and/or angular)
- Position in sensor field of view (e.g. angle from centre of image)
- Other object properties, such as reflectivity, or other aspects of its response to different signals and/or frequencies (infrared, ultrasonic etc.)

Other examples of possible confounders include a map of the scene (indicating environmental structure), and inter-agent variables such as "busyness" (a measure of the number or density of agents in a scene), distance between agents, and agent types.

Each can be characterized numerically or categorically in one or more variable components (dimensions) of the confounder space C.

Note, however, that a confounder can be any variable representing something about the physical world that could potentially be relevant to perception error. This does not necessarily have to be a directly measurable physical quantity like velocity, occlusion etc. For example, another example of a confounder relating to another actor might be "intent" (e.g. whether a cyclist at a particular moment in time intends to turn left at an upcoming turn, or continue straight ahead, which could be determined in respect of real-world data at a given time by looking ahead to the action actually taken by the cyclist). In one sense, a variable such as intent is a latent or unobserved variable in the sense that, at a particular moment in time (before the cyclist has taken definitive action in this case), intent is not something that can be measured directly using the perception system 102 and could only be inferred though other measurable quantities; the point about confounders is that those other measurable physical quantities do not have to be known or measured in order to model the effect on intent on confounder error. It might be, for example, that there is a statistically significant increase in perception error associated with cyclists who have a "turn left" intent vs. a "continue straight" intent, which might arise from multiple, unknown and potentially complex behavioural changes in the behaviour of cyclists who are about to turn left that mean that, as a matter of fact, the perception system is worse at perceiving them. By introducing an "intent" variable as a confounder in an error model, there is no need to try to ascertain what observable, physical manifestations of intent are relevant to perception errors—provided "intent" ground truth can be systematically assigned to the training data (e.g. based on hindsight of the action ultimately taken by the cyclist) in a way that is consistent with simulations (where the intent of a simulated cyclist would be known in order to simulate their behaviour as the scenario develops), then such data can be used to build suitable behaviour models for different intents in order to simulate that behaviour, as well as intent-dependent perception error models, without having to determine what physical manifestations of intent (if any) are actually relevant to perception error. To put it another way, it is not necessary to understand why intent is relevant to perception error in order to model the effect of intent on perception error, because intent itself can be modelled as a perception confounder (rather than trying to model observable manifestations of intent as confounders).

Low Level Errors

Examples of low-level sensor errors include:
- Registration errors
- Calibration errors
- Sensor limitations Such errors are not modelled explicitly in the simulations but their effect is wrapped up in the PSPM used to model a perception slice which interprets the applicable sensor data. That is to say, these effects would be encoded in the parameters θ that characterize the PSPM. For example, for a Gaussian-type PSPM, such errors would contribute to a larger covariance denoting greater uncertainty.

High-Level Perception Errors

Other errors can occur within the perception pipeline, for example:
- Tracking errors
- Classification errors
- Dynamic object detection failures
- Fixed scene detection failures When it comes to detection, false positives and false negatives can potentially cause the prediction stack 104 and/or planner 106 to behave in unexpected ways.

Specific PSPMs are constructed in order to model this type of error, in a statistically robust fashion. These models can also take into account the influence of variable confounders c.

Using object detection as an example, detection probabilities can be measured and used to construct a detection distribution dependent on, say, distance, angle and level of occlusion (the confounders c in this example). When running the simulation then, through ray tracing from the camera, it can be ascertained that an object is "possibly" detectable, according to the model. If so, then the measured detection probabilities are checked and the object is detected or not. This deliberately introduces the possibility that an object which is sensible by the sensors is not detected in the simulation, in a way that reflects the behaviour of the perception stack 102 in real life, because of the statistically robust way in which detection failures have been modelled.

False positives could be generated randomly with a density similar to that which is measured by the PSPM. That is, in a statistically representative fashion.

2 Problem Statement

By way of further explanation, this section sets out a mathematical framework for PRISMs and introduces a particular dynamic object detection problem addressed in the subsequent sections. Section 3 discusses the dataset used for training PRISMs, techniques used for identifying relevant features and a description of evaluation methods. Section 4 describes particular modelling decisions and how those decisions were informed by data science.

Note that in the below description, the notation $x_g$, $y_g$, $z_g$ may be used to denote coordinates of a location perception ground truth t. Similarly, $x_s$, $y_s$, $z_s$ may be used to denote coordinates of a location perception stack output e. Therefore, a distribution p $(x_s, y_s, z_s|x_g, y_g, z_g)$ is one form the perception uncertainty distribution p(e|t) described above can take. Similarly, x may be used below to refer generally a set of confounders, which is equivalent to a set of confounders c or c' described above.

Perception systems have inputs that are difficult to simulate, such as camera images, lidar scans and radar returns. As these inputs cannot be rendered with perfect photorealism, perception performance in simulation will not match that in the real-world.

An aim is to construct a probabilistic surrogate model, called a PRISM, for the perception stack. The PRISM consumes a low-fidelity representation of the world state (perception ground truth) and produces perception outputs of the same format as the vehicle stack (or, more precisely, the perception slice 204 being modelled). The samples drawn from the surrogate model in simulation should look similar to the outputs from the perception stack when the stack is run on real data.

PRISM sampling should be fast enough for use as part of a simulation system for verification and development of downstream components, such as the planner.

2.1 Intuition

The following section states the most general case, motivated by the following considerations:

Some stochastic function exists which maps from the true state of the world to an output of the perception stack.
This function may be modelled using training data. The function is modelled as a probability distribution.
Since the world state changes smoothly over time, the sampled perception outputs should also change smoothly over time. Since the world state is only partially observed, an appropriate way of achieving this is to have the probability distribution depend on the history of observed world states and perception outputs.
A simulator (Genie) is responsible for producing the representation of the world at run time. The outputs of Genie are 6D pose and extent for dynamic objects and some other information like road geometry and weather conditions.
For real world training data, this world representation is obtained from annotation.

Mathematical Statement 2.2.1 Preliminaries

For any set S, let the set of histories of S be histories(S)= $\{(t, h)|t \in \mathbb{R}, h: (-\infty, t] \to S\}$. An element (t, h)∈histories(S) is composed of t, the current time, and h, a function that returns an element of S for any time in the past. The notation $\bar{x}$ indicates the simulated equivalent of x.

A perception system is a stochastic function $f$: histories (World)→histories(Perception). Usually, $f$ will be of the form $f$=perceive•sense, sense: histories(World)→histories(SensorReading), perceive: histories(SensorReading)→histories(Perception). (1)

A goal is to simulate some $f$. The world states may be broken down into a set ObservedWorld of properties that can be reliably measured (this might include meshes and textures for every object in the scene, locations of light sources, material densities, etc) and a set Unobserved World of everything else (exact pixel values of camera images, temperature at every point on every surface), such that there is a bijection between World and ObservedWorld×UnobservedWorld. In a traditional photorealistic simulation approach, simulating $f$ amounts to finding some stochastic function $\overline{sense}$: histories(ObservedWorld)→histories(SensorReading), which can be composed with perceive to form $\bar{f}$:histories(ObservedWorld)→histories(Perception),
$\bar{f}$=perceive•$\overline{sense}$. (2)

Let observe: World→ObservedWorld be the function that maps world states onto their 970 observed counterparts. Note that this function is not one-to-one: there will be many world states that map onto a single observed world state. An accurate and useful simulation $\bar{f}$ of $f$ will have $f=\bar{f}$•map(observe;), (3)

for all histories (t, h)∈histories(World), where map: ((S→T)×histories(S))→histories(T) maps a function over a history.

Then one must conclude that the optimal photorealistic simulation has $\overline{sense}$ such that sense=$\overline{sense}$•map(observe;), (4)

since combining Equations 1, 2 and 4 gives Equation 3 by associativity of •. sense predicts a joint distribution over the history of sensor readings, histories(SensorReading), and the correlation of different sensor readings enables the dependence on unobserved properties of the world to be more effectively modelled. A similar correlation should therefore be observed in the computed $\bar{f}$.

Because SensorReading has high dimensionality and sense is a stochastic function (since it is very dependent on unobserved properties of the world), finding $\overline{sense}$ such that Equation 4 holds even approximately is non-trivial. Therefore, $\bar{f}$ may be found directly.

2.2.2 Creating a Surrogate Model

Samples from a learnt PRISM distribution p(Y|X) give plausible perception outputs, Y, conditioned on a low-fidelity scene representation X (the ground truth scene). As noted, independent variables which meaningfully affect the distribution over the dependent variable are referred to herein as confounders. Part of the process of building a PRISM model is identifying relevant confounders to include in the model, as well as how these confounders should be combined. A method for identifying relevant confounders is explored in Section 3.2.

2.2.3 The Dynamic Objects Problem

A specific example of a perception system is presented—a system that detects dynamic objects in a scene using RGBD images. A "dynamic object" is a car, lorry, cyclist pedestrian or other road user, described by an oriented bounding box (6D pose and extent). The observed world is a set of such dynamic objects. In this setting, DynamicObject=Position×Extent×Orientation×Type= $\mathbb{R}^3 \times \mathbb{R}^3 \times$ Spin(3)×Categorical, Perception= $\wp$(DynamicObject), ObservedWorld= $\wp$(DynamicObject×Info), SensorReading=Image=$[0,1]^{w \times h \times 4}$, where $\bar{\wp}(s)$ is the set of finite subsets of S,[1] Type represents the object type (Car, Van, Tram, Pedestrian), Spin(3) is the set of unit quaternions and Info is an arbitrary set whose elements describe additional properties of dynamic objects that are useful to know when characterising the behaviour of the perception system, e.g. how much the object is obscured by other (possibly static) objects in the scene closer to the camera.

For simplicity, it is assumed that there are never two objects that are precisely identical. It is straight forward to extend the present teaching to the case where the elements of one or both of ObservedWorld and Perception are multisets.

This example simplifies the dynamic objects problem even further, choosing only to model the position of dynamic objects given the ObservedWorld. This includes fitting a model for the possibility of an observable object not being perceived, a false negative.

It is shown in Section 4.2.8 that false negatives are much more frequent mistakes made by the perception system 102 than false positives (spurious dynamic object detections).

For simplicity, the following description considers only position in 3D space and omits a discussion of orientations, extents, object type, or other possible perception outputs. However, the principles can be applied equally to such other perception outputs.

3 The Data

Figure 12:
FIGS. 12 and 13 show birds-eye and driver views of a roundabout scene.
Figure 13:

A particular driving scene is presented for which data has been recorded multiple times under similar conditions. The scene referred to by way of example herein is a roundabout in south-east London which lies on a testing route. The roundabout context and the path of vehicles through it can be seen in FIG. 12, with the view from a camera shown in FIG. 13.

By constraining the PRISM training data to runs on the same roundabout in similar climatic conditions, the effect of weather and sunlight as confounding factors in perception performance is minimised. The potential performance of a PRISM tested on data similarly collected is likewise maximised. PRISM performance could be tested on out-of-domain data, for example by evaluating how a PRISM trained on roundabout data performs on highway scenes.

The contents of the training data are described in detail in Section 5.

3.1 Dataset Generation

PRISM training requires datasets containing sufficient information to learn the distributions over perception errors. For simplicity, this section considers only the errors introduced by the perception system 102 when predicting the centre position of dynamic objects in the frame of the camera in which they are observed. To learn such errors the ground truth centre and perception centre estimate are required.

The ground truth centre positions are estimated from human-annotated 3d bounding boxes present in each frame of a recorded video sequence of the roundabout and applied to all dynamic objects in the scene. These bounding boxes are fit to the scene using a ground truth tooling suite. The ground truth tooling suite combines camera images, stereo depth point clouds and lidar point clouds into a 3D representation of the scene to maximise annotation accuracy. Annotation accuracy is assumed to be good enough to be used as ground truth.

FIG. 9 shows a process of obtaining stack predicted objects from recorded camera images. It is important to note that this pipeline is stateless, each pair of camera frames is processed independently. This forces any time correlation discovered in the perception error data to be attributed to the behaviour of the detector on closely related inputs, rather than internal state of a detection algorithm.

In general, sets of object predictions indexed by image timestamp combined with similarly indexed sets of ground truth data from the ground truth tooling suite is sufficient for PRISM training data. However, some models require training on data that has been annotated to determine associations between ground-truth and predicted objects of the scene. This is used to simplify the task of fitting a model of the perception output for a given ground truth, as the task can be separated into: fitting a model of position error; fitting a model for generating false negatives; fitting a model for generating false positives. False positives and false negatives are determined by pairing ground truth objects with perception outputs according to some similarity metric, such as intersection over union (IOU), labelling ground-truth objects without a pair as 'false negatives' and perception outputs without a ground-truth pair as 'false positives'.

These models may be straightforward to fit but are restricted by the requirement that each ground truth object is associated to a single perception output. This limitation does not allow modelling different possible mappings between the ground truth scene and the perception output, where multiple possible associations may exist, with the objects being 'swapped' in each case.

To avoid this limitation, a 'set-to-set' model is described below, which may be defined for the perceived scene given a ground-truth scene comprising multiple objects without defining any explicit associations between objects of the ground-truth scene and objects in the perception output. This models the probability of a given perceived scene given the ground-truth scene, considering all possible misdetections of the ground-truth scene, including false positives, false negatives, and 'swapped' detections. Another benefit is reduced annotation burden—associations between ground truth and perceived objects are not required in the training data used to train the PSPM.

4. Probabilistic Set-to-Set PRISMs

A probabilistic 'set-to-set' model which generates a distribution over perceived scenes for a given ground-truth scene may be determined given a set of training data of ground-truth scenes and perceived scenes output by the perception component being modelled. There are multiple possible approaches for this. In one case, the model may be treated as a 'black box', where parameter values defining a general probability distribution are estimated, for example by a neural network, without defining the exact form the distribution will take. An alternative is to specify a simple model based on assumptions made about the generation of perceived scenes, and fit the parameters of the specified model according to conventional model-fitting methods. Described below is an approach in which the probability over perceived scenes is factorised into a misdetection model and a noise model, with the assumption that the perceived scene is a noisy observation of an output of the misdetection model.

However, there are multiple ways to implement the misdetection and noise models. Again, assumptions may be made in order to specify the form of the probability distributions of each model, fitting the parameters of these models by conventional methods. Alternatively, the form of the distributions may be specified very generally, with separate neural networks learning the parameters of each of the misdetection and noise models. Described below is the factorisation of the perception model into misdetection and noise models and two example implementations: one in which misdetection and noise models are constructed based on a number of assumptions or observations based on data, and a second implementation in which the misdetection and noise models are implemented by trained neural networks. These two implementations also take different approaches to fitting the models. This is described in more detail in Section 5.

4.1 Model Factorisation

This section describes a simple model for a PRISM that allows for modelling of false-positive and false-negative detections using a 'set-to-set' approach, in which explicit associations between ground-truth and predicted objects are not required.

The PSPM described herein models a probability distribution of the perceived scene Y given a ground-truth scene X, which may be factorised into a noise model, which determines a probability distributions over noisy perception outputs for a detected scene, and a misdetection model, which determines a probability distribution over detected scenes for the given ground-truth scene, including true and false positive detections. The number of objects in the perception output Y is determined by the misdetection model, while the final perceived output is determined by applying the noise model to the detected scene.

Note that 'detected scene' as used in the context of set-to-set PRISMs refers to scenes modelled by the misdetection model, which may contain misdetections, e.g., false negatives or false positives. These may be referred to synonymously herein as 'misdetection scenes'.

As described above with reference to FIG. 4, for a single object approach, a PSPM may be represented as a probability density p(e|t, c) of a perception output e given a perception ground truth t and a set of one or more confounders c.

For the set-to-set approach, a PSPM can be represented as a probability density of a perceived 1115 scene Y comprising a set of perception outputs $\{e_1, \ldots, e_n\}$ given the ground-truth scene X, comprising a set of perception ground truths $\{t_1, \ldots, t_n\}$, denoted as:

$$p(Y|X).$$

A scene here refers to a set of objects. For simplicity, a scene may be assumed to comprise an arbitrary number of cars. Each car in the scene may be defined by its position p in 3D space and its occlusion rate o. The car space may be defined as:

$$\mathcal{C} = \mathbb{R}^3 \times [0,1],$$

where each car is represented by a pair $c=(p, o) \in \mathcal{C}$, comprising position $p \in \mathbb{R}^3$ and occlusion rate $o \in [0,1]$. A scene defined by an arbitrary number of cars c belongs to a scene space $\mathcal{S}$:

$$\mathcal{S} = \{\{c_1, \ldots, c_n\} : n \in \mathbb{N}, c_i \in \mathcal{C}\}$$

which is the set of all scenes. Note that this is a very simple example, and that scenes may be defined to comprise a number of different objects. Similarly, objects of the scene, including cars, may be defined by other variables in addition to position and occlusion rate.

A PSPM model p(Y|X) may be constructed, with the parameters of the model estimated from data. As described above, a single-object approach to PSPMs allows modelling of false negatives and false positives. However, this approach is limited as it requires a correspondence between objects of the ground-truth scene X and objects of a perceived scene Y.

A fully probabilistic set-to-set PSPM may be implemented by assuming that the perceived scene Y is a noisy observation of an underlying scene $X_{FP,TP} = X_{FP} \cup X_{TP}$, where $X_{FP}$ is the set of false positive detections and $X_{TP}$ is the set of true positive detections. It is assumed that Y has the same number of objects as $X_{FP,TP}$. There are no further misdetections once $X_{FP}$ and $X_{TP}$ are given and thus Y can be modelled as a simple noise model on the position of the cars in the scene $X_{FP,TP}$.

The PSPM may be factorised as follows based on the above assumption:

$$p(Y|X) = \sum_{X_{FP}, X_{TP}} p_{O|FP,TP}(Y|X_{FP}, X_{TP}) p(X_{FP}, X_{TP}|X)$$

where $$p_{O|FP,TP}(Y|X_{FP}, X_{TP}) = 0$$

when $$|Y| \neq |X_{FP} \cup X_{TP}|,$$

and where the summation symbol is used to indicate marginalisation over the detected scenes $X_{FP}$ and $X_{TP}$, which are 'unobserved'. This corresponds to a sum over the number of objects and an integral over the position of each object. In this example, it is assumed that the occlusion rate is observed such that it does not need to be marginalised over.

The two scenes $X_{TP}$ and $X_{FP}$ may be assumed to be generated independently from each other. However, this does not imply that they are independent of the ground-truth scene X.

The expression in this case may be rewritten:

$$p(Y|X) = \sum_{X_{FP}, X_{TP}} p_{O|FP,TP}(Y|X_{FP}, X_{TP}) p_{FP}(X_{FP}|X) p_{TP}(X_{TP}|X)$$

In the examples described below, it is assumed that the false positive and true positive detections are independent, and a separate example probabilistic model is described for each. However, in general, misdetections may be described by a single model in which there may be some dependence between false positive and true positive detections.

The marginalisation allows determination of a probability distribution p(Y|X) over perceived scenes Y for all possible detection outcomes. For a given ground truth, the detection model is a probability distribution over a variety of detection outcomes. The final probability distribution is a distribution over all perceived scenes, so for a scene with a given number of ground truth objects, there are multiple detected scenes that may lead to that eventual perception output. The marginalisation sums all these detected scenes, so that the perception model p(Y|X) gives the probability of the perceived scene, taking all possible combinations of false positive and true positive detections leading to that perceived scene into account.

Figure 14:
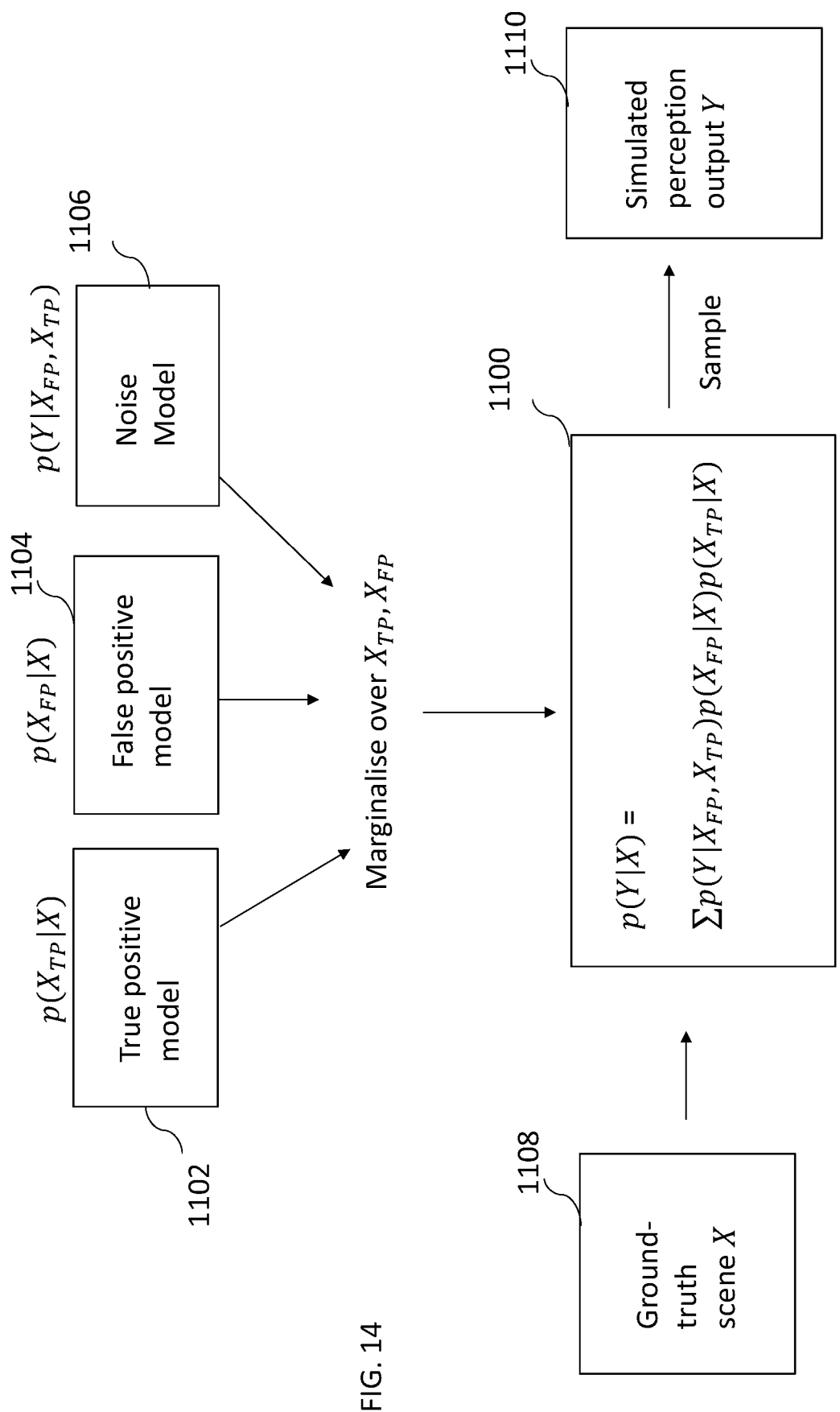
FIG. 14 shows 'set-to-set' PSPM implemented as a set of probabilistic models fit to data.

FIG. 14 shows how a PSPM model 1100 (p(Y|X)) is determined according to the equation above, by combining a model for true positive detections 1102 and a model for false positive detections 1104 given the ground truth scene 1108, and a noise model 1106 for the perceived scene given the full set of detected objects, including true positives and false positives. The false positive model 1104 and the true positive model 1102 are used to determine a 1170 respective probability density of true positives and false positives given the ground truth scene X. The noise model 1106 is used to determine the perceived scene Y, given the set of false positive and true positive detections. The PSPM model is then determined by marginalising over the true positive and false positive scenes $X_{TP}$, $X_{FP}$ as shown by the summation in the equation above. The resulting probability distribution p(Y|X) of the PSPM model 1100 may then be sampled to generate a realistic perception output scene 1110 given the ground truth scene X. The parameters of the models may be estimated based on input and output data of the perception component to be modelled by the PSPM.

4.2 Constructed Model

An example implementation is described, where models are defined which may be fit to determine a perception model p(Y|X) as defined above. In this implementation, the form of the misdetection models and noise models are specified based on assumptions made about how perception errors occur.

4.2.1 True Positive Model

To determine the set of true positive detections for the given set of ground truth objects, $P(X_{TP}|X)$, an assumption may be made about the misdetection of objects in the ground-truth scene X. For example, it may be assumed that the missed detections are independent and identically distributed according to a Bernoulli distribution. In order to define such a process, a Boolean indicator function may be introduced: b:{1, ..., n}→{0, 1} that indicates which of the cars in the ground truth scene X have been detected properly. That is b(i)=0 if the ith car has been misdetected and b(i)=1 otherwise. This may be used to define a set of true positive object detections $X_{TP}=\{x'_1, \ldots, x'_n\}=\{x_i\}_{i,b(i)=1}$, where $|b|=|X_{TP}|=\Sigma_i b(i) \le n$, by selecting the cars for which b(i)=1. Assuming that the probability of misdetection is independent and identically distributed, this leads to:

$$p_{TP}(X_{TP} \mid X) = \prod_{i=1}^{n} r_{PN}^{b(i)}(x_i)(1 - r_{PN}(x_i))^{1-b(i)},$$

where $r_{PN}(x_i) \in [0,1]$ is the false-negative rate of car i which generally depends on the location and occlusion rate of the car. Note that for scenes $X_{TP}$ that cannot be obtained from removing cars from X, i.e. if $X_{TP} \subseteq X$, we must have $p_{TP}(X_{TP}|X)=0$. In particular this means that $p_{TP}$ vanishes if $|X_{TP}|>$ The false negative rate may be modelled based on data exploration. An example model for the false negative rate may be defined by making a simplifying assumption that the false-negative rate for a car $x=(x, r_o)$ is independent of the position x and that it has a non-zero baseline and then grows linearly to 1 (its maximum value) with respect to the occlusion rate ro. This gives the following model:

$$r_{FN}(x,r_o) = \bar{r}_{FN} + r_o(1 - \bar{r}_{FN}),$$

where $\bar{r}_{FN}$ is a baseline occlusion rate to be estimated from data.

4.2.2 False Positive Model

A number of assumptions may also be made in order to generate a model for false positives. In a simple example, it may be assumed that false positive detections are independent of the ground truth scene X and that they are all independent and identically distributed. Writing $N_{FP}=|X_{FP}|$ for the number of false-positive detections, the model for false positives may be written:

$$p_{FP}(X_{FP}|X) = p_{FP|N_{FP}}(X_{FP}|N_{FP})p_{N_{FP}}(N_{FP}),$$

where $p_{FP|N_{FP}}$ is the probability density of generating scene $X_{FP}$ when there are $N_{FP}$ false-positive detections, and $p_{N_{FP}}$ is the probability of finding $N_{FP}$ false-positive detections. For 1215 simplicity, it may be assumed that this follows a Poisson distribution:

$$p_{N_{FP}}(N_{FP}) = \lambda_{FP}^{N_{FP}} \frac{\exp(-\lambda_{FP})}{N_{FP}!},$$

where $\lambda_{FP}$ is the false-positive rate which must be estimated from data.

If it is assumed that the probability of each false positive detection is dependent on the position $x_i$ of that detection only, the probability of generating a scene $X_{FP}$ of $N_{FP}$ false positive detections may be written:

$$p_{FP|N_{FP}}(X_{FP} \mid N_{FP}) = \prod_{i=1}^{N_{FP}} p_{fp}(x_i),$$

where $p_{fp}(x)$ is the prior probability distribution for false positives. As noted above, it is assumed in this simple example that this is independent of the ground-truth scene X. Alternative models may be defined for the false positive distribution which depend on the ground-truth scene.

A simple example prior distribution for false positives is given by a normal distribution centred on the origin:

$$p_{fp}(x) = \frac{1}{\sqrt{(2\pi)^3 \sigma_{fp}^2}} \exp\left(-\frac{\left(\frac{x}{\sigma_{fp}}\right)^2}{2}\right),$$

where $\sigma_{fp}$ is a variance parameter to be estimated from data. In this example, false positive detections are most likely to occur close to the origin.

4.2.3 Noise Model

As described above, the perceived scene Y is modelled as a noisy observation of the set of false positives $X_{FP}$ and true positives $X_{TP}$, where the number of objects in the scene is determined by $|X_{FP} \cup Y_{FP}|$. The probability density $p(Y|X_{FP},X_{TP})$ is therefore 0 when $|Y| \approx |X_{FP} \cup X_{TP}|$. Concentrating on the case where $|Y|=|X_{FP} \cup X_{TP}|$, it may be further assumed that the errors for each object are independent from each other.

However, note that, for this model, any object from the set $X_{FP} \cup X_{TP}$ can in principle be perceived as any object in Y as long as the assignment is one-to-one. This means that 'swapped' detections are taken into consideration. This is an advantage of the probabilistic set-to-set approach that is not addressed by single-object PSPMs.

Since any permutation of objects in the set $X_{FP} \cup X_{TP}$ may be mapped to the objects in Y, the total probability must be obtained by marginalising over all such (unobserved) assignments.

Assuming an arbitrary ordering for both sets and denoting by $\{y_1, \ldots, y_n\}$ and $\{x_1, \ldots, x_n\}$ the positions of the cars in the sets Y and $X_{FP} \cup X_{TP}$ respectively, the probability density of the perceived scene Y given the false positive and true positive detections $X_{FP}$, $X_{TP}$ (denoted $p_{O|FP,TP}(Y|X_{FP,TP})$) may be written:

$$p_{O|FP,TP}(Y \mid X_{FP,TP}) = \sum_{\sigma \in Perm.} \prod_{i=1}^{n} p_{single-object}(y_i \mid x_{\sigma(i)}),$$

where the sum runs over all permutations a of $\{1, \ldots, n\}$ and $p_{single-object}$ (Y|X) is the single-object noise model denoting the probability that an object at position x is detected at position y. Note that this example noise model is independent of the occlusion rates of the objects and depends only on their positions.

The above factorisation assumes that errors are independent between objects. However, there is no requirement that the objects of the noise model Y are associated to specific objects in the set of false positive and true positive detections $X_{TP} \cup X_{FP}$, as all possible correspondences are considered in the sum of permutations. This allows modelling of 'swapped' detections without requiring correlations between objects to be modelled.

Note that the number of terms in the sum grows factorially with the number of cars n in the scene, such that approximate methods are required for dealing with non-trivial cases. A simple heuristic is to filter out pairs of boxes that are so far away that p $(y_i|x_{\sigma(i)}) \ll 1$.

For the single-object noise model, it may be assumed that the errors are unbiased and normally distributed as follows:

$$p_{single-object}(y \mid x) = \frac{1}{\sqrt{(2\pi)^3 \sigma(x)^2}} \exp\left(-\frac{\left(\frac{y-x}{\sigma(x)}\right)^2}{2}\right),$$

where $\sigma(x)$ is a parametric variance model. A simple model would be:

$$\sigma(x) = \alpha x^2 + \beta |\phi|,$$

where $\phi$ is the angle between the direction of the car and the position of the object x. The above model depends only on the ground-truth position. An alternative model for variance may define a constant $\sigma$, while other alternative models may depend on variables such as occlusion or other confounders. Note that this functional form for the variance is merely a simple example and a more appropriate expression may be obtained via data exploration. Note that since the variance $\sigma$ depends only on the ground truth position x it is shared by all objects and only introduces two parameters, $\alpha$ and $\beta$, to be estimated from data.

4.2.4 Marginalisation

Described below are a number of methods to enable the marginalisation of the simple noisy model described above over all possible false positive and true positive scenes $X_{FP}$, $X_{TP}$. This involves summing or integrating over a number of variables: (i) the number $N_{FP}$ of false-positive detections (ii) the position of each false-positive detection, and (iii) all the possible ways to generate $N_{FP} = |Y| - N_{TP}$ false-positive detections from the ground truth scene X. Note that the condition that $N_{FP} \leq |X|$ restricts the number of false-positive detections $N_{FP}$ to be at least $|Y| - |X|$. Informally, this means that the sum over $X_{FP}$ and $X_{TP}$ in the equation above for p(Y|X) can be replaced by:

$$\sum_{X_{FP}, X_{TP}} = \sum_{N_{FP}=max(0,|Y|-|X|)}^{|Y|} \int dx_1^{FP} \ldots dx_{N_{FP}}^{FP} \sum_{|b|=|Y|-N_{FP}},$$

where $x_i^{FP}$ are the positions of the false-positive detections and the last sum is over all indicator functions b such that $|b| = \sum_{i=1}^{|y|} b(i) = N_{TP}$. Note that the sum over all permutations in the equation above is not included here but also needs to be performed.

Some methods that make the task of performing the sum above more manageable for the given example models described above include:

- As described before, the sum over permutations can be truncated using simple heuristics.
- The sum over $N_{FP}$ can be truncated at a low enough rate $\lambda_{FP}$ since the probability of generating a large number of false-positive detections is low. Alternatively, a hard cut-off can be introduced (e.g. maximum 3 false-positive detections).
- For each ground-truth scene X and a given false-negative rate model $r_{FN}$, the sum over the indicator functions b can be precomputed. Moreover, if the false-negative rate model does not depend on the occlusion rate it can even be computed explicitly.
- When $p_{single-object}$ and $p_{fp}$ are both Gaussian, the integrals over $x_i^{FP}$ can be computed explicitly (only if $\alpha = \beta = 0$).

This provides an effective way to compute p(Y|X) for any observed scene Y and ground-truth scene X.

The fitting of the model is carried out to optimise the generated perceived scenes More detail on training of model parameters is described in Section 5.

4.2.5 Sampling

The PSPM model is trained by fitting the parameters of p(Y|X) to maximise the probability of the actual perception outputs of the training data according to the model. The training process is described in Section 5 below.

Once the parameters of the set-to-set PSPM model p(Y|X) have been determined by fitting the data of the perception component to be modelled, realistic perception outputs may be generated by sampling from the PSPM probability distribution p(Y|X). The sampled scenes Y include false positive detections, false negatives (missed detections) and noise, as described above. Unlike with single-object PSPMs, there is no requirement that objects in the ground-truth scene X correspond with any specific object in the generated scene Y. This allows generation of a greater variety of realistic scenes Y.

For the simple models described above, where the PSPM comprises Gaussian and Poisson distributions, it may be possible to approximate the sum above using some of these techniques to arrive at a simple expression for p(Y|X) which may be sampled to generate realistic perception scenes.

4.3 Neural Network Implementation

Instead of specifying individual models as above, a general probability distribution may be modelled using neural networks without requiring as many assumptions about the underlying perception system. A network for misdetections, for example, may take the position and occlusion rate as input, along with any other relevant confounder variables, and output a set of parameters defining the misdetection distribution, i.e. a probability distribution over the space of all possible misdetection scenes for the given ground-truth scene. Neural networks may be used to learn various forms of probability distributions, such as Gaussian mixture models, which may be a combination of distributions dependent on a set of parameters. The resulting distributions may be sampled, for example using a variational autoencoder, or another known sampling method, to generate a representative set of samples. For example, a misdetection distribution predicted by a neural network may be sampled to generate a representative set of misdetection scenes for the given input ground truth.

Probability densities may also be modelled directly using neural networks for density estimation, for example using normalizing flows, which learn a transformation of a simple initial distribution to build complex probability densities. This may be used to generate samples from a modelled distribution, by inputting samples from the simple initial distribution and applying the transformation defined by the neural network. A review of normalising flows, including implementing normalizing flows in deep neural networks, is given in Papamakarios, George, et al. "Normalizing flows for probabilistic modelling and inference." arXiv preprint arXiv:1912.02762 (2019), which is incorporated herein by reference in its entirety.

As described above, the overall perception model is factorised into a misdetection distribution $p(X_{TP}, X_{FP}|X)$ and a noise model $p(Y|X_{TP}, X_{FP})$. Again, the misdetection model may treat the false positive model and true positive model independently, such that the misdetection model can be written:

$$p(X_{TP}|X)p(X_{FP}|X).$$

An overall misdetection model may be implemented as a neural network. Alternatively, a separate neural network model may be trained to model each of false negatives and false positives. The results of the misdetection model are then input to another neural network 1355 which models a noise distribution over misdetections.

Figure 15:
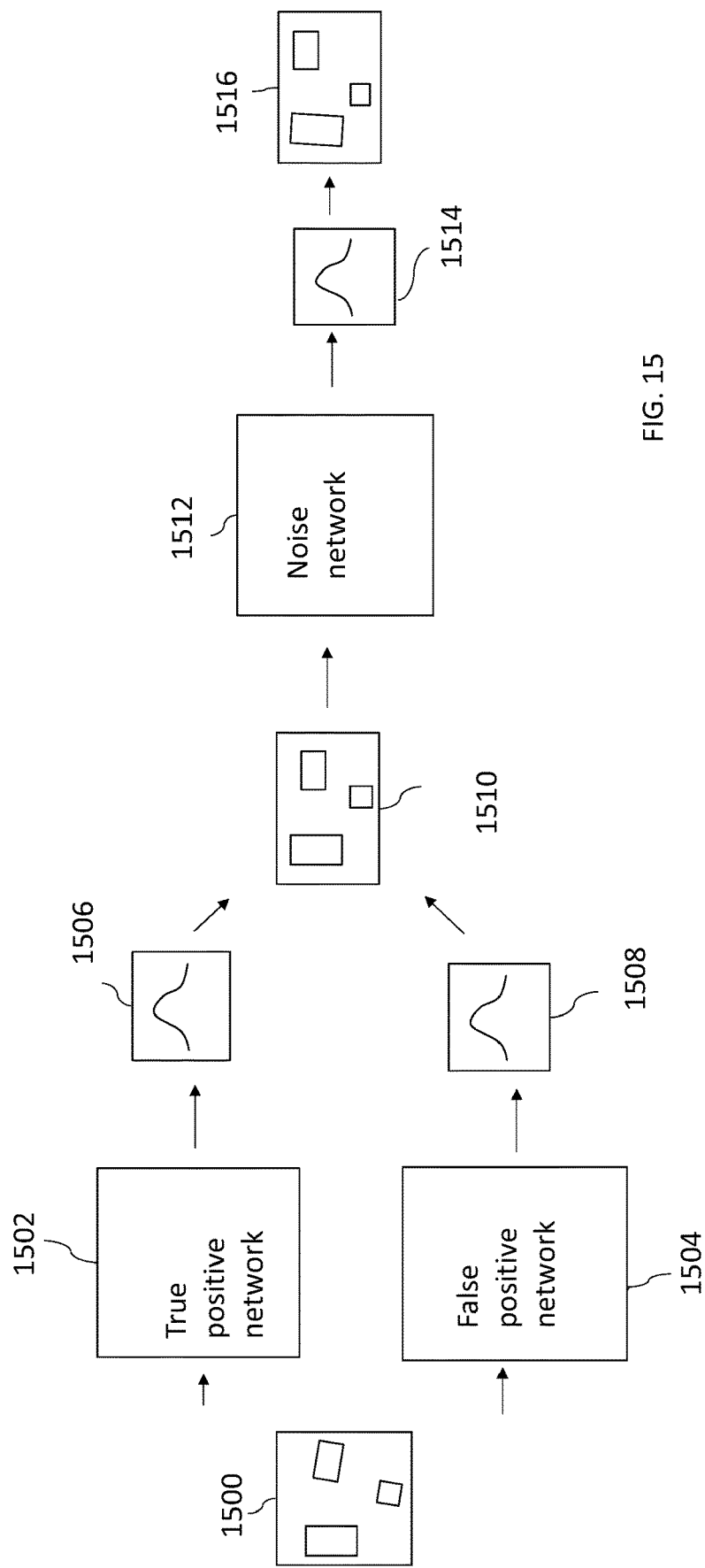
FIG. 15 shows an example neural network implementation of a 'set-to-set' PSPM.

FIG. 15 shows an example neural network implementation of the perception model p(Y|X) comprising neural network models of probability densities. The ground truth scene 1500 and any relevant confounders, for example occlusion, are input to the false positive network 1504 and the true positive network 1502. Each of these predict parameters of respective probability 1360 distributions 1506, 1508 over false positive detections and true positive detections for the given ground truth. Each distribution is predicted by applying weights of the neural network to the ground truth scene and other input variables, such as occlusion rate. The resulting distributions may be sampled to generate a given set of false positives and false negatives making up a sampled 'misdetection' scene 1510 for the given ground-truth scene.

Misdetection scenes sampled from the false positive distribution 1508 and true positive distribution 1506 are passed to a neural network 1512 modelling the noise distribution. As described above, the noise model is assumed to be a noisy observation of the misdetection scene. Thus there is a constraint on the noise model that for a given misdetection scene comprising a set of objects, the resulting perception output must contain the same number of objects. This constraint should be imposed on the distribution 1514, whose parameters are modelled by the neural network 1512, or where using normalising flows, the distribution 1514 is modelled directly. However, the other assumptions applied when constructing the simple model in section 4.2, in order to generate simple models dependent on only a small number of parameters, are no longer necessary, and the noise model does not need to assume, for example, that the errors for different objects of the scene are independent of each other.

The output of the noise network 1512 may be a probability distribution 1514 over perception scenes for the given input scene of 'misdetections'. This distribution may be sampled to generate different noisy observations 1516 of the same scene.

To compute the overall perception distribution p(Y|X) for the given ground-truth scene, i.e. to perform the marginalisation over misdetection scenes, multiple misdetections may be sampled from the misdetection distribution determined by the false positive network 1504 and true positive network 1502. Each misdetection scene sampled from the false positive and true positive distributions may then be passed to the noise network 1512 to generate a noise distribution. A sum over sampled misdetections may be computed to approximate a marginalisation over the space of misdetections, similar to the sum described in section 4.2.4 for the constructed model. To generate multiple realistic perception outputs for a given ground truth scene, where different misdetection outcomes are possible, the overall distribution may be sampled by first sampling the misdetection distribution(s) defined by the misdetection network(s) and then sampling from the noise model 1514 for each sampled misdetection.

If the probability distributions are instead modelled by neural networks directly, using normalising flow, the output of the misdetection neural network is a set of sampled misdetection scenes, and the output of the noise network 1512 is a set of sampled observed scenes 1516.

Summarizing the above, in broad terms, there are two sampling-based approaches with neural networks.

In the first approach, each neural network predicts the relevant distribution (e.g. noise, true positive or false positive) at its output layer, or more precisely one or more distribution parameters (e.g. mean variance etc.) parameterizing the relevant distribution. In this case, a distinction is drawn between the model parameters (the neural network weights in this case) and the distribution parameter(s) that are predicted at the output layer (which depend on the weights and the input to the network).

In the second approach, each neural network is used to generate samples of the relevant distribution. For example, a flow-based method, such as Normalizing Flows (NF) can be used. In this case, samples may be taken from a simple distribution (e.g. normalized Gaussian) and transformed by the neural network, in order to generate corresponding samples of the relevant distribution (e.g. noise, true positive or false positive). In effect, the neural network learns an invertible transformation from the simple distribution to the distribution of interest. In this case, the model parameters are the weights of the neural networks that encode this transformation. The ability of neural networks to learn complex non-linear functions allows complex distributions to be modelled. NF is one example of a neural network-based sampling method, but it will be appreciated that other sample-based approaches, e.g. based on generative adversarial networks or variational autoencoders, can be used.

Reference may be made herein to "computing" a distribution. For the avoidance of doubt, according to the present terminology, a distribution may be computed by generating a representative set of samples thereof.

5. Model Training 5.1 Model Fitting

In summary, the simple constructed model described in section 4.2 introduces the following parameters: (i) the false-negative baseline rate $\bar{r}_{FN}$, (ii) the parameters of the false-positive detections $\lambda_{fp}$ and $\sigma_{fp}$, and (iii) the parameters of the noise variance $\alpha$ and $\beta$. However, as described above, various models may be used to build an overall model of perception $p_\theta(Y|X)$, each associated with its own set of parameters to be fit to data.

The model is fit to training data comprising ground-truth scenes and corresponding perceived scenes from the perception component to be modelled. Once $p_\theta(Y|X)$ has been computed in optimal parameters can be estimated by minimizing the negative log likelihood of the observations given the ground-truth—$\log(p_\theta(Y|X))$ using a variety of numerical methods.

For the neural network implementations described above, the parameters to be learned are the weights of the neural networks themselves, where the neural network is trained to predict probability distributions, or parameters defining probability distributions, which depend on the input to the network. The parameters of the neural network are iteratively updated using gradient-based optimisation methods such as gradient descent. This optimisation minimises a loss function, such as the negative log likelihood function, which encourages the network to learn a distribution under which the perceived scenes are most probable. In this case, the probability of a perceived scene of the training data may be computed from the distribution over perceived scenes, obtained by marginalising over a sufficient sampling of misdetection scenes as described in section 4.3 above. Sampling-based methods of training deep neural networks are described for example in Mohamed, Shakir, et al. "Monte Carlo Gradient Estimation in Machine Learning." arXiv preprint arXiv:1906.10652 (2019), which is incorporated herein by reference in its entirety.

Figure 16:
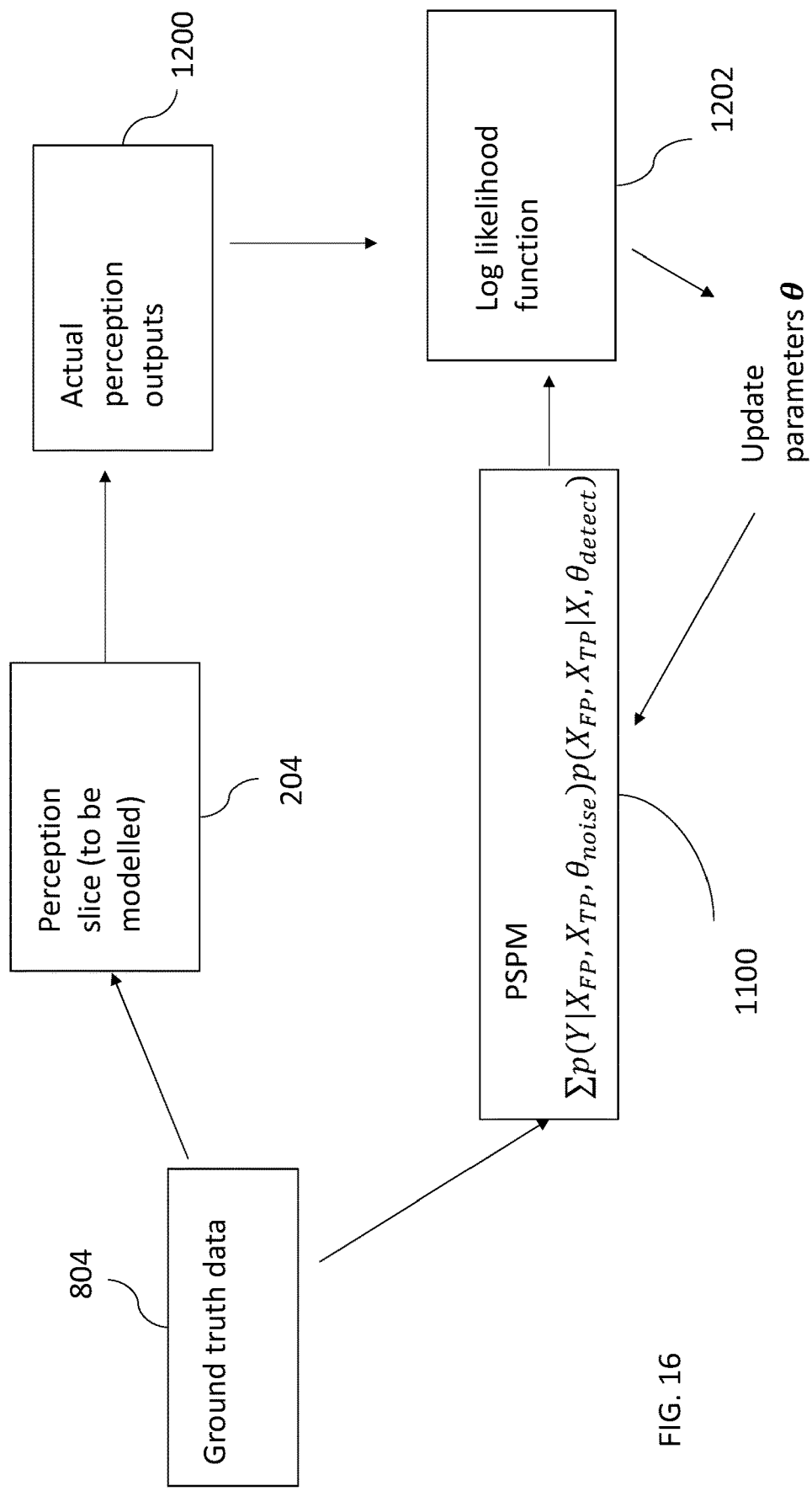
FIG. 16 shows the fitting of model parameters of a PSPM to data.

FIG. 16 shows how the parameters of the probabilistic PSPM 1100 may be fit to data by optimising a negative log likelihood function. The training data is generated based on ground 1445 truth annotated data 804 and real perception outputs 1200 from the perception slice 204 to be modelled. The PSPM 1100 provides a probability distribution $p_\theta(Y|X)$ of the perception output for the given ground truths, depending on the parameters of the model θ, comprising noise parameters $\theta_{noise}$ and detection parameters $\theta_{detect}$. This training method may apply to either a constructed model, where the parameters $\theta_{noise}$ and $\theta_{detect}$ are parameters of the distribution themselves, or a neural network model, where the parameters correspond with the weights of the misdetection and noise networks respectively.

A log likelihood function may be used to learn the parameters of the model 1100 that maximise the probability of the actual perception outputs 1200 under the model 1100. The parameters which maximise the log likelihood function are those for which the actual perception outputs of the perception component to be modelled are most probable, given the ground-truth inputs to the perception model.

It is not typically possible to determine optimal parameters analytically, except for very simple models. Numerical optimisation methods such as gradient descent may be used to iteratively update the model parameters to obtain a local maximum likelihood of the actual perception outputs 1200. This is shown in FIG. 16, where the gradient of the log likelihood function is used to update the parameters θ, before recomputing the log-likelihood function for training data based on the new parameters.

Contents of the Training Data

The following definitions are provided for the training data:

centre_x, centre_y, centre_z: The x,y,z coordinates of the centre of the ground truth 3d box.

orientation_x, orientation_y, orientation_z: The x, y, z components of an axis-angle representation of the rotation from the camera frame (front stereo right) to the ground truth 3d box frame.

height, width, length: The extent of the ground truth 3d box along the z, y, x axes in the 3d box's coordinate frame.

manual_visibility: Label applied by human annotator as to which of four visibility categories the ground truth object belongs. The categories are: fully-occluded (100%), largely-occluded (80-99%), somewhat-occluded (1-79%) and fully-visible (0%).

occluded: The fraction of the area of the ground truth 2d bounding box that is overlapped by the 2d bounding boxes of other ground truth objects that are closer to the camera.

occluded_category: A combination of manual_visibility and occluded that can be thought of as the maximum of the two. It is useful to combine manual_visibility and occluded in this way to maximise the number of correct occlusion labels. To see this, note that objects occluded by static parts of the scene (bushes, trees, traffic lights) will have an occluded score of 0, but will have a correctly set manual_visibility by the human annotator. Objects that are only occluded by other ground truth objects do not have the manual_visibility field set by human annotators, but will have a correct occluded field. These two cases can be handled by taking the maximum of the two values. Even with this logic, it is possible for the 2d bounding box of a ground truth object to completely obscure that of an object behind it, even if some of the background object is visible. This will generate some fully-occluded cases which can be detected by the perception system.

truncated: The fraction of the eight vertices of the ground truth 3d box that lie outside the sensor frustum.

type: When attached to a ground truth object (false negatives, ground truth part of associated pair) this is a human annotated object type, such as Car or Tram. When attached to a predicted object (false positives, predicted part of associated pair) this is the perception stack's best guess at object type, limited to Pedestrian or Vehicle.

In addition to the above, the following derived quantities will be referred to in this section:

distance: The distance of the object centre from the camera, calculated as the Euclidean norm of the object centre position in the camera frame.

azimuth: The angle formed between the projection of the ray joining the camera and object centres onto the camera's y=0 plane, and the camera's positive z axis. Polarity is defined by the sense of rotation about the camera's y axis. Range is restricted to $[-\pi r/2, \pi/2]$ as objects behind the camera cannot be observed.

The makeup of the dataset will be discussed in detail where relevant in later sections. A high level summary of the data is presented below.

15 traversals of the roundabout scene, spanning approximately 5 minutes of total footage.

8600 unique frames containing 96k ground truth object instances visible to the camera.

Of these 96k instances: 77% are cars; 14% are vans; 6% are pedestrians; 3% belong to a range of smaller groups.

Of these 96k instances: 29% are fully visible; 43% are somewhat occluded; 28% are largely occluded.

Identifying Relevant Confounders

As described above, the ground truth data may be associated with one or more confounders, which relate to the conditions of the scene, such as lighting, weather conditions, etc. In the example models above, only the occlusion rate of the object is included in the models. However, generally, the models described above may be defined to depend on any relevant confounders.

Selection of confounder variables is based on analysis carried out on the data, in order to determine which confounders have the greatest effect on perception error. As described earlier, different models may be trained for different confounder values.

There are many confounders that might be considered for a PRISM model. Rather than optimise a model for every possible combination of confounders, it is preferable to perform such an optimisation over a restricted set of confounders known to be relevant.

To identify relevant confounders, a Relief-based algorithm is used. An outline of a general Relief-based algorithm is given in Algorithm 1. The Relief algorithm yields an array of feature weights in the range [−1, 1], where a weight greater than 0 indicates the feature is relevant, as changes in the feature tend to change the target variable. In practice, some features will have a weight greater than 0 by chance, only the features with weight greater than some user-defined cut-off $0 < \tau < 1$ are chosen.

---

Algorithm 1 Calculate feature weights $W = (W_i, \ldots, W_a)$ for dataset $[(\vec{x}_i, y_i)]_{i=1}^n$, where y is some (scalar or categorical) target variable and $\vec{x} = (x_1, \ldots, x_a)$ is some set of (scalar or categorical) feature variables.

Data: $S = [s_i]_{i=1}^n$, $s_i = (\vec{x}_i, y_i)$
Required: $d(\vec{x}_i, \vec{x}_j)$, a distance function on the feature space
$W_i \leftarrow 0, i = 1, \ldots, a$
for $s_i \in S$ do $j \leftarrow \arg\min_j d(\vec{x}_i, \vec{x}_j): y_i = y_j, i \neq j$ $k \leftarrow \arg\min_k d(\vec{x}_i, \vec{x}_k): y_i \neq y_k, i \neq k$ for $p \in 1, \ldots, a$ do
  if $(\vec{x}_i)_p \neq (\vec{x}_j)_p$ then
    decrease $W_p$
  end if
  if $(\vec{x}_i)_p \neq (\vec{x}_k)_p$ then
    increase $W_p$
  end if
end for
end for

---

This algorithm has the following desirable properties:
It is sensitive to nonlinear relationships between features and target variables. Other feature selection methods, such as a naive principal component analysis or comparison of Pearson correlation, are not sensitive to these kinds of relationships. Not all things that are uncorrelated are independent.
It is sensitive to interactions between features.
It is conservative. It errs on the side of accidentally including irrelevant or redundant confounders rather than accidentally excluding relevant ones.

It is important to note the following caveats of this approach:
It identifies correlations in the data, but provides no insight into how or why the target variable is correlated with the confounders under investigation.
The results depend on the parameterisation of the confounding variables.

There are many extensions to the Relief algorithm. An extension called MultiSURF is used here. MultiSURF was found to perform well across a wide range of problem types, and is more sensitive to interactions of three or more features than other methods. The implementation is used from scikit-rebate, an open-source Python library that provides implementations of many Relief-based algorithms extended to cover scalar features and target variables.

In experiments $$\tau = \frac{1}{\sqrt{\alpha n}}$$

is used, where n is the size of the dataset and $\alpha = 0.2$ is the desired false discovery rate. By Chebyshev's inequality, this lets us say that the probability of accepting an irrelevant confounder as relevant is less than a.

Relief based methods are a useful tool for identifying plausible confounders and their relative importance. However, not all features which affect the error characteristics of the perception system will be captured in the annotated training data. A manual process of inspecting model failures to hypothesise new features to label as confounders is necessary.

PSPM Applications

There are a number of useful applications of PSPMs, some of which will now be described.

7.1. Planning Under Uncertainty

The use case set out above tests planning under uncertainty. This means testing how the planner 106 performs in the presence of statistically representative perception errors. In that context, the benefit arises in the ability to expose the planner 106 and prediction stack 104 to realistic perception errors in a robust and efficient manner.

One benefit of the confounder approach is that, when an instance of unsafe behaviour has occurred in a particular scenario, the contribution of any confounders to that behaviour can be explored by running the same scenario but with different confounders c (which may have the effect of changing the perception uncertainty p(e|t,c)).

As already mentioned, when sampling from the PSPMs, there is no requirement to sample in a uniform way. It may be beneficial to deliberately bias the sampling towards outliers (i.e. lower probability PSPM samples).

The way that confounders c are incorporated also facilitates the testing of more challenging scenarios. For example, if it is observed through simulation that the planner 106 is making relatively more errors in the presence of occlusion, that could be a trigger to test more scenarios in which external objects are occluded.

7.2. Separating Perception and Planning/Prediction Error

Another somewhat related, but nonetheless separate application, is the ability to isolate the cause of unsafe decisions by the planner 106 within the runtime stack 100. In particular, it provides a convenient mechanism to reason about whether the cause was perception error as opposed to prediction/planning errors.

For example, consider a simulated scenario in which an instance of unsafe behaviour occurs. This unsafe behaviour could have arisen because of a perception error but equally it might have been caused by a prediction or planning error.

To help isolate the cause, the same scenario could be run but without the PSPMs i.e. directly on the perfect perception ground truths instead, to see how the planner 106 performs in exactly the same scenario but with perfect perception outputs. If unsafe behaviour still occurs, this points to the unsafe behaviour being at least partially attributable to errors outside of the perception stack 102, which could indicate prediction and/or planning errors.

7.3. Training

Simulation can also be used as a basis for training, such as reinforcement learning training. For example, simulation may be used as a basis for training of components within the prediction stack 104, planner 106 or controller 108. In some circumstances, there may be benefits to running training simulations based on realistic perception outputs provided by PSPMs.

7.4 Testing Different Sensor Arrangements

One possible advantage of the PSPM approach is the ability to simulate sensor types/positions not actually tested. This can be used to make reasoned inferences about, say, the effect of moving a particular set of sensors on the AV, or of using a different type of sensors.

For example, a relatively simple way to test the impact of reducing the pixel resolution of the on-board cameras would be to reduce the pixel resolutions of the annotated images in the annotated ground truth database 804, re-build the PSPMs and re-run the appropriate simulations. As another example, simulations could be re-run with a particular sensor modality (such as LiDAR) removed altogether to test what effect that might have.

As a more complex example, inferences could be drawn about the effect of changing a particular sensor on the perception uncertainties. It is unlikely that this would be used as a basis for proving safety, but this could be used as a useful tool when considering e.g. camera placement.

7.6 PSPMs for Simulated Sensor Data

Whilst the above considers PSPMs generated via the application of a perception slice 204 to real sensor data, the actual perception outputs used to train the PSPM could instead be derived by applying the perception slice 204 to simulated sensor data, in order to model the performance of the perception slice 204 on simulated sensor data. Note, the trained PSPM does not require simulated sensor data—it is still applied to perception ground truth, without the need to simulate sensor inputs. Simulated sensor data is only used to generate the actual perception outputs used for training. This can be useful as way to model the performance of the perception slice 204 on simulated data.

6.7 Online Applications

Certain PSPMs may also be usefully deployed on an AV at runtime. That is, as part of the runtime stack 100 itself. This, in turn, ultimately could assist the planner 106 in taking account knowledge of perception uncertainty. PSPMs can be used in conjunction with existing online uncertainty models used as a basis for filtering/fusions.

Because PSPMs are confounder-dependent, in order to maximize the usefulness of a PSPM at runtime, the relevant confounders would need to be measured in real-time. This may not be possible for all confounder types, but PSPMs can still be usefully deployed when the appropriate confounders are measurable.

For example, an uncertainty estimate by a PSPM may be used as a prior at run time in conjunction with an independent measurement of uncertainty from one of the AV's online uncertainty models. Together, these may provide a more reliable indication of the actual perception uncertainty.

Structure perception refers to a class of data processing algorithms which can meaningfully interpret structure captured in perception inputs (sensor outputs or perception outputs from lower-level perception components). Such processing may be applied across different forms of perception input. A perception input refers generally to any structure representation, i.e. any set of data in which structure is captured. Structure perception can be applied in both two-dimensional (2D) and three-dimensional (3D) space. The results of applying a structure perception algorithm to a given structure input are encoded as a structure perception output.

One form perception input is a two-dimensional (2D) image; that is, an image having only a colour component (one or more colour channels). The most basic form of structure perception is image classification, i.e. the simple classification of an image as a whole in relation to a set of image classes. More complex forms of structure perception applied in 2D space include 2D object detection and/or localization (e.g. orientation, pose and/or distance estimation in 2D space), 2D instance segmentation etc. Other forms of perception input include three-dimensional (3D) images, i.e. images having at least a depth component (depth channel); 3D point clouds, e.g. as captured using RADAR or LIDAR or derived from a 3D image; voxel or mesh-based representations of structure, or any other form of 3D structure representation. Examples of perception algorithms which may be applied in 3D space include 3D object detection and/or localization (e.g. distance, orientation or pose estimation in 3D space) etc. A single perception input may also be formed of multiple images. For example, stereo depth information may be captured in a stereo pair of 2D images, and that image pair may be used as a basis for 3D perception. 3D structure perception may also be applied to a single 2D image, an example being monocular depth extraction, which extracts depth information from a single 2D image (noting that a 2D image, without any depth channel, may nonetheless capture a degree of depth information in its one or more colour channels). Such forms of structure perception are examples of different "perception modalities" as that term is used herein. Structure perception applied to 2D or 3D images may be referred to as "computer vision".

Object detection refers to the detection of any number of objects captured in a perception input and typically involves characterizing each such object as an instance of an object class. Such object detection may involve, or be performed in conjunction with, one or more forms of position estimation, such as 2D or 3D bounding box detection (a form of object localization, where the aim is to define an area or volume in 2D or 3D space which bounds the object), distance estimation, pose estimation etc.

In a machine learning (ML) context, a structure perception component may comprise one or more trained perception models. For example, machine vision processing is frequently implemented using convolutional neural networks (CNNs). Such networks require large numbers of training images which have been annotated with information that the neural network is required to learn (a form of supervised learning). At training time, the network is presented with thousands, or preferably hundreds of thousands, of such annotated images and learns for itself how features captured in the images themselves relate to annotations associated therewith. Each image is annotated in the sense of being associated with annotation data. The image serves as a perception input, and the associated annotation data provides a "ground truth" for the image. CNNs and other forms of perception model can be architected to receive and process other forms of perception inputs, such as point clouds, voxel tensors etc., and to perceive structure in both 2D and 3D space. In the context of training generally, a perception input may be referred to as a "training example" or "training input". By contrast, training examples captured for processing by a trained perception component at runtime may be referred to as "runtime inputs". Annotation data associated with a training input provides a ground truth for that training input in that the annotation data encodes an intended perception output for that training input. In a supervised training process, parameters of a perception component are tuned systematically to minimize, to a defined extent, an overall measure of difference between the perception outputs generated by the perception component when applied to the training examples in a training set (the "actual" perception outputs) and the corresponding ground truths provided by the associated annotation data (the intended perception outputs). In this manner, the perception input "learns" from the training examples, and moreover is able to "generalize" that learning, in the sense of being able, one trained, to provide meaningful perception outputs for perception inputs it has not encountered during training.

Such perception components are a cornerstone of many established and emerging technologies. For example, in the field of robotics, mobile robotic systems that can autonomously plan their paths in complex environments are becoming increasingly prevalent. An example of such a rapidly emerging technology is autonomous vehicles (AVs) that can navigate by themselves on urban roads. Such vehicles must not only perform complex manoeuvres among people and other vehicles, but they must often do so while guaranteeing stringent constraints on the probability of adverse events occurring, such as collision with these other agents in the environments. In order for an AV to plan safely, it is crucial that it is able to observe its environment accurately and reliably. This includes the need for accurate and reliable detection of real-world structure in the vicinity of the vehicle. An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on perception inputs from the sensor system. A fully-autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Hence, in the field of autonomous driving and robotics more generally, one or more perception components may be required for interpreting perception inputs, i.e. which can determine information about real-world structure captured in a given a perception input.

Increasingly, a complex robotic system, such as an AV, may be required to implement multiple perception modalities and thus accurately interpret multiple forms of perception input. For example, an AV may be equipped with one or more stereo optical sensor (camera) pairs, from which associated depth maps are extracted. In that case, a data processing system of the AV may be configured to apply one or more forms of 2D structure perception to the images themselves—e.g. 2D bounding box detection and/or other forms of 2D localization, instance segmentation etc.—plus one or more forms of 3D structure perception to data of the associated depth maps—such as 3D bounding box detection and/or other forms of 3D localization. Such depth maps could also come from LiDAR, RADAR etc, or be derived by merging multiple sensor modalities.

The present techniques can be used to simulate behaviour of a variety of robotic systems for the purpose of testing/training etc. Run time application may also be implemented in different robotic systems.

In order to train a perception component for a desired perception modality, the perception component is architected so that it can receive a desired form of perception input and provide a desired form of perception output in response. Further, in order to train a suitably-architected perception component based on supervised learning, annotations need to be provided which accord to the desired perception modality. For example, to train a 2D bounding box detector, 2D bounding box annotations are required; likewise, to train a segmentation component perform image segmentation (pixel-wise classification of individual image pixels), the annotations need to encode suitable segmentation masks from which the model can learn; a 3D bounding box detector needs to be able to receive 3D structure data, together with annotated 3D bounding boxes etc.

A perception component may refer to any tangible embodiment (instance) of one or more underlying perception models of the perception component, which can be a software or hardware instance, or a combined software and hardware instance. Such an instance can be embodied using programmable hardware, such as a general-purpose processor (e.g., CPU, accelerator such as a GPU etc.) or a field programmable gate array (FPGA), or any other form of programmable computer or computers. A computer program for programming a computer can thus take the form of program instructions for execution on a general-purpose processor, circuit description code for programming an FPGA etc. An instance of a perception component can also be implemented using non-programmable hardware, such as an application specific integrated circuit (ASIC), and such hardware may be referred to herein as a non-programmable computer. In general, a perception component may be embodied in one or more computers which may or may not be programmable, and which are programmed or otherwise configured to execute the perception component.

With reference to FIG. 8, the depicted pipeline components are functional components of a computer system which may be implemented at the hardware level in various ways: although not shown in FIG. 8, the computer system comprises one or more processors (computers) which carry out the functionality of the aforementioned components. A processor can take the form of a general-purpose processor such as a CPU (Central Processing unit) or accelerator (e.g. GPU) etc. or more specialized form of hardware processor such as an FPGA (Field-Programmable Gate Array) or ASIC (Application-Specific Integrated Circuit). Although not shown separately, a UI typically comprises at least one display and at least one user input device for receiving user inputs to allow a user to interface with the system, such as a mouse/trackpad, touchscreen, keyboard etc.

Note the terms "perception pipeline", "perception stack" and "perception system" are used synonymously herein. The term "perception slice" is used to refer to all or part of a perception stack (comprising one or more perception components) that is modelled by a single PSPM. A perception stack may be wholly or partially replaced with one or more PSPMs during simulation safety-testing. The term slice may also be used to refer to part of the prediction stack that is not modelled by or replaced by a PSPM, and the meaning will be clear in context.

It will be appreciated that various embodiments of the invention have been described by way of example only. The scope of the invention is not defined by the described examples but only by the accompanying claims.

The invention claimed is:

1. A computer-implemented method of modelling a perception system, the perception system for perceiving objects captured in sensor data, the method comprising:
receiving a plurality of training examples, each comprising a ground truth scene for a set of sensor data and a corresponding perceived scene obtained by applying the perception system to the set of sensor data; and
fitting, to the plurality of training examples, one or more noise model parameters and one or more misdetection model parameters, the one or more noise model parameters encoding a noise distribution over possible perceived scenes given a misdetection scene, and the one or more misdetection model parameters encoding a misdetection distribution over possible misdetection scenes given a ground truth scene, wherein the fitting comprises computing a perception model distribution over possible perceived scenes for the ground truth scene of each training example and using the perceived scene for each training example, by marginalizing a product of the noise distribution with the misdetection distribution over multiple possible misdetection scenes, wherein a number of objects in each of the multiple possible misdetection scenes is constrained to match a number of objects in the perceived scene, but the number of objects in the ground truth scene is not constrained to match a number of objects in the perceived scene, and the training example does not associate individual objects in the ground truth scene with individual objects in the corresponding perceived scene.

2. The method of claim 1, wherein fitting, to the plurality of training examples, the one or more noise model parameters and the one or more misdetection model parameters comprises applying maximum likelihood estimation to the one or more noise model parameters and the one or more misdetection model parameters.

3. The method of claim 1, wherein the one or more misdetection model parameters comprise one or more false positive parameters and one or more false negative parameters, the false positive parameters encoding a false positive distribution over false positive misdetections, and the false negative parameters encoding a false negative distribution over false negative misdetections, and wherein the misdetection distribution is a product of the false positive distribution and the false negative distribution.

4. The method of claim 3, wherein the marginalization is performed by summing the product over multiple permutations of false positive and false negative outcomes.

5. The method of claim 1, wherein the product is summed over a determined subset of possible misdetection scenes, the subset determined based on one or more heuristics.

6. The method of claim 5, wherein the subset is a determined subset of permutations of false positive and false negative outcomes.

7. The method of claim 1, wherein the one or more noise model parameters encode a set of single-object noise distributions over possible object positions, each single-object noise distribution corresponding to an object of the misdetection scene, wherein the noise distribution over possible perceived scenes for a given misdetection scene is a product of the single-object noise distributions for that misdetection scene.

8. The method of claim 1, wherein the one or more noise model parameters comprise one or more Gaussian noise model parameters, and the one or more misdetection model parameters comprise one or more Gaussian noise model parameters.

9. The method of claim 1, wherein the one or more noise model parameters are weights of a first neural network, and the one or more misdetection model parameters are weights of a second neural network.

10. The method of claim 9, wherein the first neural network predicts, in dependence on the one or more noise model parameters, one or more noise distribution parameters of the noise distribution, and the second neural network predicts, in dependence on the one or more misdetection model parameters, one or more misdetection distribution parameters of the misdetection distribution.

11. The method of claim 9, wherein the first neural network generates samples of the noise distribution, and the second neural network is used to generate samples of the misdetection distribution.

12. A computer system comprising:
memory embodying computer-readable instructions; and
one or more processors coupled to the memory,
the computer-readable instructions configured, when executed on the one or more processors, to cause the computer system to implement steps of:
receiving a ground truth scene comprising one or more objects;
processing the ground truth scene in a perception model to determine a perception distribution over possible perceived scenes, the perception model comprising noise parameters and misdetection parameters, the noise parameters and misdetection parameters trained to model the perception system in accordance with claim 1; and
generating one or more perceived scenes for the given ground truth scene by sampling from the perception distribution one or more times.

13. The computer system of claim 12, wherein the computer-readable instructions are configured to cause the computer system to obtain multiple perceived scenes with different misdetection outcomes for the same ground truth scene by sampling from the perception distribution multiple times.

14. The computer system of claim 13, wherein the different misdetection outcomes comprise different combinations of at least one of false positive object detections or false negative object detections.

15. The computer system of claim 12, wherein the computer-readable instructions are configured to cause the computer system to generate the perception ground truth scene directly from a simulated scenario, wherein the perception ground truth scene corresponds to an output of the perception system but is generated without applying the perception system and without use of synthetic sensor data.

16. The computer system of claim 15, when applied to performance test a robotic planner in presence of perception error, wherein the robotic planner plans a trajectory for a mobile robot in the simulated scenario based on a perceived scene sampled from the perception distribution.

17. The computer system of claim 16, when applied to performance test a planning and prediction system comprising the robotic planner and a prediction stack, wherein the robotic planner plans the trajectory based on one or more agent trajectories predicted by the prediction stack based on the perceived scene.

18. The computer system of claim 16, comprising a test oracle configured to apply a set of predetermined rules to assess behaviour of the mobile robot in the simulated scenario.

19. The computer system of claim 18, wherein at least one of the predetermined rules pertains to safety, and wherein the test oracle is configured to assess the safety of a mobile robot's behaviour in the simulated scenario.

20. Non-transitory computer-readable storage media having embodied thereon computer-readable instructions configured to cause, when executed on one or more hardware processors, the one or more hardware processors to implement operations of modelling a perception system, the perception system for perceiving objects captured in sensor data, the operations comprising:

receiving a plurality of training examples, each comprising a ground truth scene for a set of sensor data and a corresponding perceived scene obtained by applying the perception system to the set of sensor data; and fitting, to the plurality of training examples, one or more noise model parameters and one or more misdetection model parameters, the one or more noise model parameters encoding a noise distribution over possible perceived scenes given a misdetection scene, and the one or more misdetection model parameters encoding a misdetection distribution over possible misdetection scenes given a ground truth scene, wherein the fitting comprises computing a perception model distribution over possible perceived scenes for the ground truth scene of each training example and using the perceived scene for each training example, by marginalizing a product of the noise distribution with the misdetection distribution over multiple possible misdetection scenes, wherein a number of objects in each of the multiple possible misdetection scenes is constrained to match a number of objects in the perceived scene, but the number of objects in the ground truth scene is not constrained to match a number of objects in the perceived scene, and the training example does not associate individual objects in the ground truth scene with individual objects in the corresponding perceived scene.

* * * * *